US008068696B2

(12) United States Patent  (10) Patent No.: US 8,068,696 B2
Crombez et al.  (45) Date of Patent: Nov. 29, 2011

(54) METHOD OF RESTORING MOVEMENTS OF THE LINE OF SIGHT OF AN OPTICAL INSTRUMENT

(75) Inventors: Vincent Crombez, Lacroix Falgarde (FR); Umberto Polverini, Pechabou (FR); Gregory Flandin, Toulouse (FR)

(73) Assignee: Astrium SAS, Paris (FR)

( * ) Notice: Subject to any disclaimer, the term of this patent is extended or adjusted under 35 U.S.C. 154(b) by 1001 days.

(21) Appl. No.: 11/695,896

(22) Filed: Apr. 3, 2007

(65) Prior Publication Data

US 2008/0031528 A1  Feb. 7, 2008

(30) Foreign Application Priority Data

Apr. 3, 2006  (FR) ...................................... 06 02904

(51) Int. Cl.
G06K 9/32 (2006.01)
(52) U.S. Cl. ........ 382/294; 382/284; 382/293; 348/140; 348/142; 348/143
(58) Field of Classification Search .................. 382/284, 382/294
See application file for complete search history.

(56) References Cited

U.S. PATENT DOCUMENTS

| 4,688,091 A | * | 8/1987 | Kamel et al. | 348/147 |
|---|---|---|---|---|
| 4,995,101 A | * | 2/1991 | Titterton et al. | 398/125 |
| 5,155,597 A | * | 10/1992 | Lareau et al. | 348/311 |
| 5,502,482 A | * | 3/1996 | Graham | 348/140 |
| 5,606,627 A | * | 2/1997 | Kuo | 382/154 |
| 5,692,062 A | * | 11/1997 | Lareau et al. | 382/107 |
| 5,790,188 A | * | 8/1998 | Sun | 348/144 |
| 5,987,164 A | * | 11/1999 | Szeliski et al. | 382/154 |
| 6,066,850 A | * | 5/2000 | Hersom et al. | 250/342 |
| 6,075,905 A | * | 6/2000 | Herman et al. | 382/284 |

(Continued)

FOREIGN PATENT DOCUMENTS

FR  2828314 A  2/2003

OTHER PUBLICATIONS

Norimoto C et al : "Fast Electronic Digital Image Stabilization for Off-Road Navigation" Real-Time Imaging, Academic Press Limited GB, vol. 2, N° 5, Oct. 1996, pp. 285-296, XP 004419665 ISSN : 1077-2014.

(Continued)

*Primary Examiner* — Jason M Repko
*Assistant Examiner* — Gandhi Thirugnanam
(74) *Attorney, Agent, or Firm* — Patzik, Frank & Samotny Ltd.

(57) ABSTRACT

A method of estimation of the direction of the line of sight comprising forming at least two images representing one and the same portion of the scene (P) at two successive instants using an instrument mounted on a moving carrier, and the determination of the change of orientation of the line of sight by matching homologous points (A1, A2) in the two images of the same portion of scene by calculating the angular variations in attitude between the two instants at which the two successive images are obtained and by correcting on the basis of the deviation, between the estimate of the point (A2) homologous in the image provided by a model, and the actual position of the homologous point, and integrating and time filtering pertaining to a sequence of several successive determinations of attitude variations, leading to an estimate of the direction of the line of sight.

27 Claims, 9 Drawing Sheets

U.S. PATENT DOCUMENTS

| | | | |
|---|---|---|---|
| 6,211,906 B1* | 4/2001 | Sun | 348/144 |
| 6,215,522 B1* | 4/2001 | Rouge et al. | 348/315 |
| 6,266,453 B1* | 7/2001 | Hibbard et al. | 382/294 |
| 6,493,021 B1* | 12/2002 | Rouge et al. | 348/145 |
| 6,529,267 B1* | 3/2003 | Duchon et al. | 356/2 |
| 6,847,865 B2* | 1/2005 | Carroll | 701/3 |
| 7,046,831 B2* | 5/2006 | Ruchala et al. | 382/131 |
| 7,580,591 B2* | 8/2009 | Oldroyd | 382/294 |
| 7,616,836 B2* | 11/2009 | Valadez | 382/294 |
| 2002/0163582 A1* | 11/2002 | Gruber et al. | 348/218.1 |
| 2003/0044085 A1* | 3/2003 | Dial et al. | 382/293 |
| 2005/0147324 A1* | 7/2005 | Kwoh et al. | 382/293 |
| 2006/0017816 A1* | 1/2006 | Gat | 348/208.99 |
| 2007/0003165 A1* | 1/2007 | Sibiryakov et al. | 382/294 |
| 2008/0031528 A1* | 2/2008 | Crombez et al. | 382/232 |

OTHER PUBLICATIONS

Kim S P et al : Subpixel Accuracy Image Registration by Spectrum Cancellation Statistical Signal and Array Processing. Mineapolis, Apr. 27-30, 1997, Proceedings of the International Conference on Acoustics, Speech, and Signal Processing (ICASSP), New York, IEEE, US, vol. 4, Apr. 27, 1993, pp. 153-156, XP 010110958 ISBN: 0-7803-0946-4.

Li, R. et al., Programmatic Processing of High-Resolution Airborne and Satellite Linear Array Stereo Images for Mapping Applications, International Journal of Remote Sensing, 2002, vol. 23, No. 20, 4451-4473.

* cited by examiner

METHOD OF RESTORING MOVEMENTS OF THE LINE OF SIGHT OF AN OPTICAL INSTRUMENT

FIELD OF THE INVENTION

The invention relates to the field of the utilization of a sequence of successive images provided by an optical observation instrument mounted on a moving carrier such that the successive images represent a band of an observed scene, with overlap between images.

BACKGROUND OF THE INVENTION

The invention finds a particularly important though non-exclusive application in the non-real-time utilization of the images provided by an Earth observation instrument carried by a satellite or an aircraft moving along a substantially known trajectory.

The reconstruction of the variations in the orientation of the line of sight of the instrument in the course of successive image sequences is essential for the utilization of the images obtained, in order to restore the geometry thereof and be able to locate the objects observed in a georeference frame with the desired degree of accuracy.

Restoration of the orientation at each image sequence with respect to a reference frame is required in particular in order to achieve good performance in the case of satellites that use an instrument for taking pictures in the visible/IR region.

For each image sequence, the instrument will be oriented and stabilized in a given direction, possibly with a small residual rotation speed controlled by the user. During image sequences, the information delivered by the strip-detectors will be stored and then forwarded and processed on the ground in order to reconstruct two-dimensional images of the zones observed.

The reconstruction of these images requires restoration of the movements of the line of sight during image sequences, this line of sight not being absolutely stable during image sequences, on account of residual satellite movements in roll, pitch and yaw, in a frequency span that may reach as much as several hundred hertz on account of high-frequency disturbances (vibrations generated by certain equipment). Moreover, purely geometric effects have to be taken into account. For example, taking pictures of a band of terrain that exhibits a craggy relief that is not necessarily known leads to different effects of the variations in line of sight depending on the altitude of the point observed.

According to the prior art, the orientation and angular movements of the line of sight are determined at any instant during image sequences by using position and angular velocity sensors, such as star sensors and gyroscopes. However, the increasing resolution of instruments requires ever more accurate attitude restoration that is difficult to achieve with such sensors. In actual fact, star sensors provide a very high attitude measurement accuracy, but within a relatively low frequency range (typically below a few hertz). Gyroscopes are likewise limited in terms of bandwidth (typically less than a few tens of hertz), often because of their electronics. Moreover, neither of these two types of sensors provides a direct measurement of the line of sight of the instrument because, by their very nature, they only provide information about their own orientation. This is particularly limiting when dealing with the restoration of movements of the line of sight at high frequency, typically 50-150 hertz, since here the vibrations at these frequencies affect the line of sight of the instrument and the sensors themselves differently.

SUMMARY OF THE INVENTION

The present invention is aimed at providing a method and a device for measuring and restoring the movements of the line of sight of an optical instrument and the orientation of the line of sight at each image sequence with respect to an initial frame, doing so without necessarily using the position and angular velocity measurements from external sensors, but rather by direct use of the images captured by the instrument itself.

With this aim, the invention proposes in particular a method of restoring the movements of a line of sight in terms of roll, pitch and yaw of an observation instrument during an image sequence, according to which, at least two images containing one and the same portion of a scene are formed, over the picture-taking duration [Ti, Tf] on the basis of the instrument mounted on a moving carrier, the takes of these two images being offset in time by a substantially constant known value T and the said movements of the line of sight of the instrument in the course of the image sequence are determined by at least the following steps:

a) a step of selecting and matching several homologous characteristic zones taken in the vicinity of instants respectively Tn and Tn+T (n=1 to N) distributed between Ti and Tf in the said images of the same portion of the scene so as to obtain a measurement of the position at the instants respectively Tn and Tn+T (n=1 to N) of the said homologous zones, or of at least a particular point of these zones, in each of the two images of the said portion, b) a step of calculating the angular variations of the line of sight of the instrument between the instants Tn and Tn+T (n=1 to N) by adjusting an image matching model, the said model giving for any point of a first image taken at the instant Tn (n=1 to N), an estimate of the position of its homologous point in a second image taken at the instant Tn+T as a function of parameters comprising in particular the orientation of the line of sight of the instrument at the instant Tn and the said angular variations of this line of sight between Tn and Tn+T, the adjustment of the model consisting in calculating the values of the said angular variations which minimize a function, for example a quadratic function, of the deviations between the position of the homologous zones of the second image that are predicted by the model, and the position of the said homologous zones of the second image as it is restored in step (a), and c) a step of reconstructing the movements of the line of sight over the time horizon [Ti, Tf] by integrating, filtering and possibly resampling the whole set of elementary variations reconstructed in step (b).

The expression "characteristic zone" is understood to mean for example a portion of the scene of typically a few hundred pixels which contains radiometric (luminance and/or chrominance), geometric or textural information rendering it suitable for matching. The expression "characteristic point" is understood to mean a point whose immediate vicinity is a characteristic zone in the above sense. In practice, this leads to the use, as characteristic zones, of the locations for which the second-order local derivatives of the radiometry are non-zero in two distinct directions.

Step (a) may implement a matching of characteristic zones of images that is based on a geometric, radiometric or textural resemblance between at least two images acquired during the image sequence.

The method as defined above thus makes it possible to achieve relative restoration of the orientation of sighting, with respect to an initial frame; this relative restoration is sufficient to meet the usual requirements, that is to say the provision of information making it possible to allow for alteration of lengths, to superimpose spectral bands, to allow for altimetry and to superimpose images from several sensors of the instrument that are sensitive in different spectral bands.

However, it is also possible to implement the above method to determine the orientation of the line of sight in an absolute manner in inertial space, by supplementing the indications provided by the instrument and the associated calculation means with indications provided, at time intervals which may be sizeable, by an absolute precision sensor, such as a star sensor.

The method is based on the matching of points or zones of the image that may be: characteristic points (in the sense stated earlier), points predetermined independently of the image in the vicinity with or without a priori knowledge of particular elements present in the scene, points selected from a substep of characteristic points or zones.

In particular, at least one of the following procedures may be used to select the characteristic zones associated with a given image sequence date Tn:
  selection of the points with double gradient greater than a given threshold in a zone of the image corresponding to the image sequence taken in the vicinity of the instant Tn;
  selection of points having positions that are predetermined independently of the content of the image in the vicinity of these points, with possible rejection of points for which a matching quality criterion is below a given threshold;
  selection of predetermined points, given by a priori knowledge of particular elements present in the scene;
  selection of a subset of points on the basis of a set of characteristic points calculated by one of the above procedures or a similar procedure, so as to maximize the spatial distribution of the said points, and the quality of matching of the characteristic zones in the vicinity of these points;
  selection of a vignette, typically of a few tens of pixels to a few hundred pixels, in the vicinity of the points so as to improve the quality of matching.

The matched images are taken in spectral bands that may be identical or different. The quality of matching (for example based on a correlation measure) is an important criterion in the geometric model adjustment step.

The matching step may be implemented by conventional registration methods, such as for example that described in the article by KIM S. P. ET AL: "Subpixel accuracy image registration by spectrum cancellation"; Image and multidmensional signal processing. MINNEAPOLIS, APR. 27-30, 1993, PROCEEDINGS OF THE INTERNATIONAL CONFERENCE ON ACOUSTICS, SPEECH, AND SIGNAL PROCESSING (ICASSP), NEW YORK.

In particular, in step (b), when a quadratic function of the deviations is used, the said deviations involved in the quadratic criterion to be minimized are weighted by a positive scalar proportional to the estimated quality of the said matching of the said characteristic zones between the two images, the estimate of the said quality of matching being calculated according to the prior art procedures (correlation calculation for example).

The step of reconstructing the movements of the line of sight over the time horizon [Ti, Tf] consists in integrating, filtering and possibly resampling the whole set of elementary variations reconstructed by adjusting the geometric model. An inverse filtering (of Wiener or Kalman type) may be used so as to enhance certain attenuated frequencies while limiting the impact of noise. For the low frequencies, another approach consists in fitting an analytical model, for example an estimate of the coefficients of a polynomial of degree not exceeding 5 in general according to a least squares procedure. This filtering step must mitigate a temporary lack of correlation data according to an appropriate interpolation technique. A priori knowledge about the frequency content of the movements of the line of sight can be used at this juncture.

In particular, in the course of step (c), an integration, a filtering and possibly a resampling of the attitude variation estimates arising from step (b) may be performed so as to reconstruct the movements of the line of sight of the instrument, apart from absolute component of the orientation of sighting, over the time interval [Ti, Tf] by at least one of the following procedures:
  using an inverse filtering, making it possible to enhance certain attenuated frequencies while limiting the impact of noise, for example a Wiener or Kalman filter,
  by fitting an analytical model, for example estimating the coefficients of a polynomial of degree not exceeding 5 in general according to a least squares procedure.

In the absence of sufficient quality matching of the characteristic zones selected at the instant Tn, the orientation of the line of sight at the instant Tn is advantageously calculated by interpolating the line-of-sight orientations reconstructed by applying the method at instants preceding and following Tn.

The a priori knowledge of the frequency content of the variations of the orientation of the line of sight may be used to perform a filtering prior to step (c) that retains only the frequencies concerned.

When more than two images are available, any pair of images provides movement information which can be intermerged. The merging may be iterative in which case the order of the iterations affects the final performance. The iterations may be continued until the data is exhausted or until the process converges. The pairs of images with the strongest correlation provide more accurate and more robust movement information which makes it possible, as appropriate, to correct the movements of the line of sight of an image whose content is not so strongly correlated. Stated otherwise, if a number of images of one and the same scene that is strictly greater than two is used, the method may be applied to several pairs of images and the results obtained from the various pairs of images of the same scene are hybridized by implementing a global or iterative refinement of the current knowledge of the orientation of the line of sight during the image sequence.

In particular, the method may be applied to a first pair of images advantageously from among the pairs of images that are assumed to be best correlated, for example those taken in one and the same spectral band, so as to obtain a first reconstruction of the movements of the line of sight of the instrument in the course of the image sequence, then another pair of images is processed, initializing the matching model on the basis of the line-of-sight orientation values calculated in the previous step, and so on and so forth until the data are exhausted or convergence is obtained.

Advantageously, the instrument makes it possible to form at least three images offset over time, at least two of the images exhibiting a strong mutual correlation, and at least one other image that is weakly correlated with the other two, and the movements of the line of sight are corrected on at least one image that is weakly correlated with the other two by reconstructing the said movements of the line of sight by applying the method to at least one pair of images exhibiting a strong mutual correlation.

The matching model may be initialized with a priori knowledge of the orientation of the line of sight in the course of the image sequence This a priori knowledge may arise from an orientation setpoint or from a measurement derived from attitude sensors such as star sensors, gyrometers, etc, or from a knowledge of the absolute position on the surface of the terrestrial globe of characteristic zones recognizable in the image, or a hybridization of such knowledge. The parallax effects may be taken into account in the matching model by using a priori knowledge of the relief of the scenes observed.

The method according to the invention and as presented hereinabove applies advantageously to the calculation of the orientation of the line of sight of a picture-taking optical instrument onboard a satellite, this application being characterized in that:
  the said instrument comprises in its focal plane at least one strip-type detector, typically of one to a few tens of lines and each comprising a few thousand to ten thousand pixels,
  the said satellite is placed in a non-geostationary orbit,
  the satellite is pointed in such a way that the said at least one strip-type detector scans the zone to be observed during image sequences, and
  the method as defined above is applied to estimate the orientation of the line of sight of the instrument in the course of an image sequence.

As a variant, the application is such that:
  the picture-taking instrument still comprises, in its focal plane, at least one strip-type detector,
  the line of sight of the instrument is controlled in such a way that the said at least one detector scans the surface of the terrestrial globe, either by rotation of the satellite, or by the scanning of an orientatable mirror placed in the optical path of the instrument, and
  the method of the invention, as defined hereinabove, is applied to estimate the orientation of the line of sight of the instrument during an image sequence.

In this variant, the satellite may also be placed in a non-geostationary orbit, but the orbit of the satellite may also be geostationary.

As a variant likewise, and regardless of the application case previously envisaged, the picture-taking instrument may comprise, in its focal plane, at least two strip-type detectors, the strips being aligned in such a way that their lines and columns are respectively substantially parallel, and the two strips of each pair of strips, at least one pair of which is thus in the focal plane, being separated from one another by a distance of typically a few fractions of a mm to a few mm in the focal plane, the detectors thus observing approximately the same portion of the scene during an image sequence, with a time offset depending directly on the distance between the detectors at the focal plane.

Again as a variant, each line of the detectors of the focal plane may form an image of the scene, and a subset of the images thus created by the whole set of detectors of the focal plane can be processed according to the method of the invention for restoring the orientation of the line of sight of the instrument.

According to another variant, the instrument comprises at least one main strip-type detector in its focal plane, this detector being used for image capture according to desired mission characteristics (sweep width, resolution, image quality, etc.), at least one dedicated detector, of smaller size, typically a matrix of 100×100 pixels, or a strip of 1000×10 pixels, is added to the focal plane for the purposes of applying the method according to the invention and as defined hereinabove, and the said dedicated detector is placed a certain distance from the said main detector, and the method according to the invention is applied.

As at least two aligned and spaced-apart strip-type main detectors, or at least one main strip-type detector and one dedicated detector spaced apart from one another are arranged in the focal plane of the instrument, the separation of the detectors in this focal plane is optimized with the aim of reconstructing the movements of the line of sight in a given frequency band.

Finally, according to yet another variant, the instrument comprises just one detector at the focal plane scanning the scene, and the method according to the invention and as defined hereinabove is applied to at least two images formed on the basis of at least two lines of the detector.

In this case, the choice of the at least two lines of the detector that are used to form the at least two images may be optimized with the aim of reconstructing the movements of the line of sight in a given frequency band.

Restoration of line-of-sight orientation by image processing may be used in a process for optimizing the quality of the image provided by the instrument as regards alteration of lengths, planimetric restitution, altimetric restitution, superposition of images from multiple sensors and/or formed at different instants. The method also makes it possible to measure micro-vibrations of the instrument to the extent that their frequency does not exceed those that can be restored by the method.

BRIEF DESCRIPTION OF THE DRAWINGS

Other characteristics and advantages of the invention will emerge from the description given hereinbelow, by way of nonlimiting example, of exemplary embodiments described with reference to the appended drawings in which.

DETAILED DESCRIPTION OF THE INVENTION

Figure 1:
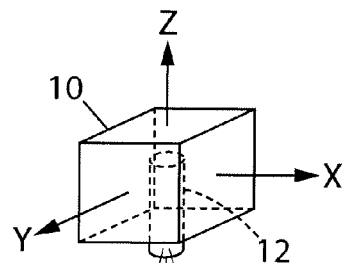
FIG. 1 is a basic diagram showing the formation of images of successive portions of a strip of terrain observed from a non-geostationary satellite provided with a nadir sighting instrument.

FIG. 1, which is a simple diagram which is not to scale, shows a satellite 10 whose platform carries an instrument 12 having at its focal plane a two-dimensional matrix detector controlled in such a way that two successive images, for example 14a and 14b, captured at instants separated by a time interval T, exhibit considerable overlap, which will generally be at least equal to half the image. Each image consists of a matrix of pixels grouped into rows (perpendicular to the direction of displacement) and columns (parallel to the direction of displacement). In the case of an apparatus with a detector consisting of a strip, operating on the so-called "push-broom" principle, the strip is oriented in the direction of the rows (lines) of the image to be obtained.

The platform of the satellite 10, and consequently the instrument, may exhibit movements about three axes x (roll), y (pitch) and z (yaw). All these movements lead to variations in the orientation of the line of sight V.

The roll, pitch and yaw line-of-sight variations may also be due to vibrations propagating in the instrument.

Instead of comprising a single detector making it possible to take successive pictures with an overlap, the apparatus can comprise two detectors that are separated in the field in the direction of scanning, giving rise to a mean time interval T between the acquisition of a point by one of the detectors and the acquisition of the same point by the other detector.

Figure 2:
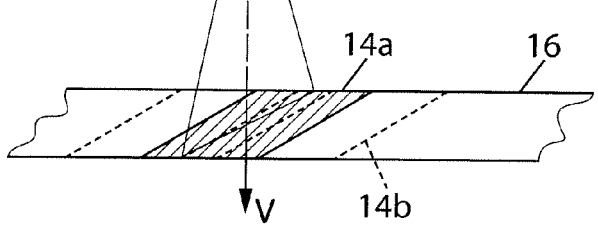
FIG. 2 is a diagram showing the effect of a variation in the line of sight in terms of roll between two successive images.

FIG. 2 shows an offset between two successive images that is caused by a roll movement $\Delta\theta x$ (about the x axis). Instead of exhibiting the relative arrangement indicated by the solid-line box and the chain-dotted box in FIG. 2, the images 14a and 14b have a relative arrangement of the kind shown at 14a and 14b, that is to say an offset in the direction of the rows.

Figure 3:
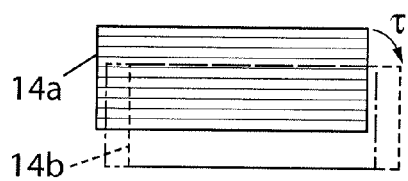
FIG. 3, similar to FIG. 2, shows the effect of a variation in the line of sight in terms of pitch.

As shown in FIG. 3, a modification in orientation pitch-wise leads, to first order, to an additional offset of the image in the direction of the pixel columns that is constant over the whole width of the field and equal to $k \cdot \Delta\theta y$ ($\Delta\theta y$ being the variation of orientation about the pitch axis and k being a constant).

A variation $\Delta\theta z$ about the yaw axis gives rise to a rotation of the image which essentially causes a position modification in the pixel column direction that is variable over the width of the field.

Finally a yaw-wise line-of-sight positioning error gives rise to first order to an offset of the image in the row direction, that is constant over the width of the field and which will generally not be able to be decorrelated from that caused by a roll variation.

When the line of sight is pointed slightly away from the nadir, the roll and pitch positioning errors are modified, but by an amount that it will often be possible to neglect.

Figure 4:
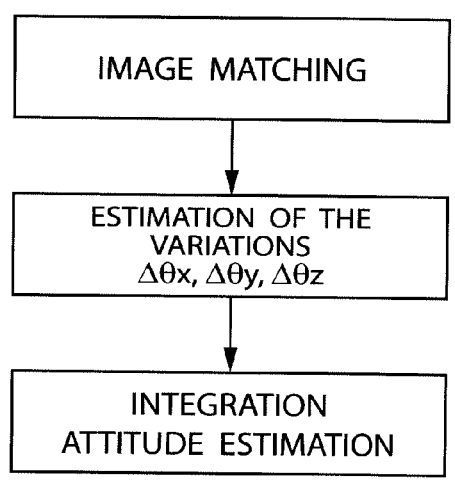
FIG. 4 is a flowchart of the method.

The method according to the invention may be considered as comprising three successive steps, indicated in FIG. 4.

The first step consists of an image processing intended to match the various images available (at least two for one and the same portion), having acquired one and the same portion of the zone at different instants, doing so by utilizing their radiometric, geometric or textural resemblance.

The second step consists in deducing, from the identification of several pairs of homologous points, over a short duration, the information regarding angular variation about the three axes x, y and z, doing so by taking account of a geometric model of the device, defined hereinbelow, and by refining it. In principle, two pairs of homologous points in two images enable the variations to be determined. However, the use of more than two pairs makes it possible to effect a filtering on the correlation noise and also on the errors related to the relief of the scene observed and that are caused by parallax in particular.

The third step consists in integrating the measurements so as to arrive at an estimate of the attitude at each image sequence, with respect to an initial frame. This frame may be only relative if the image processing alone is used. It may be rendered absolute by periodic adjustment based on an absolute restitution of attitude in an inertial frame with the aid of additional sensors, such as gyros or especially star sensors.

Once the images have been digitized at the output of the video chain, the various steps of the method may be carried out by a computer device consisting for example of a data acquisition and preprocessing chain, a main processing chain including hardware (microprocessor, FPGA, ASIC) and software, the whole assembly making it possible to carry out the processing steps according to the method, the implementation of this software providing the desired numerical variables, that is to say in particular the angles and the rates of rotation of the line of sight of the instrument considered.

The above steps will now be described in greater detail using the following notation for simplicity:
PSD: power spectral density
MTF: modulation transfer function
DEM: digital elevation model (or digital terrain model)
PAN: panchromatic (image)
XS: multispectral (image)
NIR: near infrared (image)

The method of attitude restoration which will now be described more completely makes it possible in particular to improve the restitution performance as regards:
  the superimposability of panchromatic and XS working bands of two detectors with which the instrument is equipped and which provide two images of the same scene that are obtained with a time offset,
  the superimposability of the pixels of a panchromatic band in inter-strip zones (in the case of a push-broom scan with a strip detector),
  the allowance for the alteration of lengths due to movements,
  the improving of accuracy in the nonlinear time component of the attitude of the instrument.

The matching will often be done in the course of step a) on the basis of images obtained in different spectral bands, insofar as a correlation may be effected. However, certain spectral bands correlate poorly with one another because they have different radiometric contents. Such is for example the case between the NIR band and the visible bands. In this case, restitution achieved by comparing images in the panchromatic and XS bands (or between two visible bands) makes it possible to then apply the image restitution to the NIR band; more generally, restitution makes it possible to superimpose images in different spectral bands of the instrument having a weak radiometric correlation.

The alteration in lengths may be determined in particular on the basis of the matching between PAN and XS pixels.

The benefit of determining the relative attitude by image processing is that it gives linear information which may be integrated over time to adapt the measurement performed to the duration (or "horizon") required, generally several seconds. This approach is much more favorable than the use of gyroscopes, which require lengthy integration of the measurements and cause an accumulation of errors. Matching between the panchromatic and XS pixels makes it possible in particular to use a sizeable time interval and hence to limit the amplitude of the integration errors.

As indicated above, the second step of the method implements a geometric modeling for matching the image sequences.

A general account of the implementation of the various steps will now be given first, followed by more detailed indications regarding certain steps.

I—Successive Steps

1. Image Matching

The image matching may be performed by known filtering techniques, by Fourier transform, by wavelet decomposition. The method uses a determination of a certain number of characteristic points identified as exhibiting vicinities with a strong variation in radiometry (typically second derivative with respect to distance greater than a threshold in at least two different directions) and searches for the points homologous to the characteristic points in at least one other image by utilizing resemblances. It is desirable to use more than two pairs of points so as to take account of possible matching errors that may have various origins, such as the radiometric quality of the images, the geometric quality of the images and the spectral content of the images.

In practice, the registration techniques currently available make it possible, in the case of images that resemble one another very closely, to achieve a resolution of up to 0.01 pixels for images corresponding to identical spectral bands and 0.1 pixels for the matching of images in two different spectral bands.

2. Estimation of Angular Variations

Figure 5:
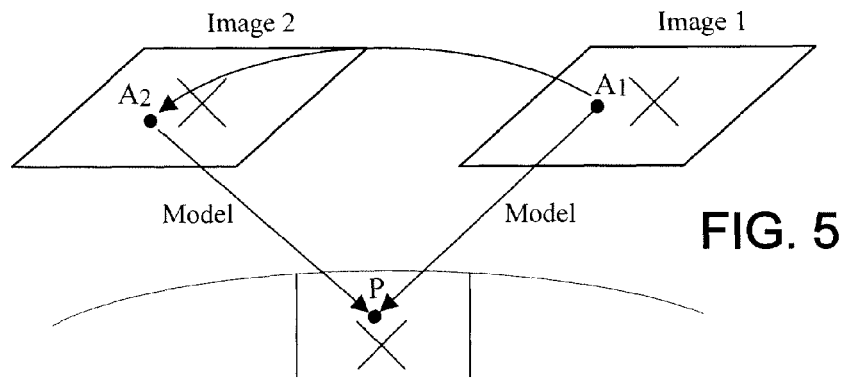
FIG. 5 shows the use of the modeling.

For the common portion of two successive images, image matching will make it possible to determine pairs of homologous points, as indicated for example diagrammatically in images 1 and 2 of FIG. 5.

Additionally, the geometric modeling of the optical system makes it possible to associate with any point of an image, such as the point A1 of image 1, a corresponding position P in the scene observed and, conversely, the inverse model associates with any point of the scene, for example with the point P, the corresponding point A1 or A2 in the image 1 or 2.

Combining the models of a pair of images thus makes it possible to obtain an estimate of the match between these images, but with uncertainties which will be reduced by taking account of the information regarding matching acquired by processing the images in the course of step 1.

The uncertainties pertain in particular to:
the position and orientation of the instrument,
the dating of the data corresponding to image 1 and to image 2,
the geometric calibration of the instrument,
the altitude of the point observed, whenever the scene is not flat,
the movement of the Earth.

A model for locating in the image and a residual model will now be considered in succession.

Model for Locating in the Image

The notation $Loc\Theta_1$ denotes the function which associates, with any pixel of the image 1, an estimate of the ground coordinates of the corresponding point P.

$$Loc\Theta_1(M(i,j))=P$$

where i and j correspond to the row and column location.

P is the point aimed at on the ground, that may, for example, be tagged by geographical coordinates ($\lambda$, $\phi$, h) which are respectively its longitude, its latitude and its altitude, $\Theta_1$ represents the whole set of parameters of the geometric model associated with image 1. These parameters may comprise the attitude of the sighting frame, the position of the satellite, the dating of the parameters, the geometric modeling of the instrument (sighting direction of each of the detectors in the sighting frame) and the altitude of the points observed.

Model of Residuals

The notation $Loc\Theta_1/\Theta_2$ will then denote the function which associates with any pixel of image 1 an estimate of its homolog in image 2. This function results from combining the direct model of image 1 and the inverse model of image 2:

$$Loc\Theta_1/\Theta_2=Loc\Theta_1 o(Loc\Theta_2)^{-1}$$

This function will be called the geometric matching model, or more simply the matching model.

H will denote the image-based correlation function which, with a point M1 of image 1, associates by correlation its homolog M2 in image 2.

$$H(M_1(i_1,j_1))=M_2(i_2,j_2)$$

Ideally, one would have $H=Loc\Theta_1/\Theta_2$.

In practice, H is affected by the image matching error and $Loc\Theta_1/\Theta_2$ is affected by the uncertainty in the knowledge of the parameters of the model, and in particular, of the attitude parameters of the sighting frame.

The notation $Res\Theta_1/\Theta_2$ will designate the residual function which, for any point of image 1, associates the deviation between the point M2 of image 2, obtained by the function H, and the point M'2 obtained by $Loc\Theta_1/\Theta_2$. The following formulae (1) then hold:

$$Res\Theta_1/\Theta_2(M1(i_1,j_1))=M_2 \cdot M'_2=(di,dj)=(i'_2-i_2,j'_2-j_2)$$

with
$M_2(i_2,j_2)=Loc\Theta_1/\Theta_2 (M1(i_1,j_1))$
$M'_2(i'_2,j'_2)=H (M1(i_1,j_1))$, homologous point, obtained by image correlation for example.

On the basis of several pairs of homologous points, obtained by correlation, in the two images and by considering an initial geometric model for each of the two images, a measure of residual is obtained.

Effect of Errors

It is appropriate to analyze the error sources at this juncture.

The error sources may be distributed into:

1) Matching errors, made when associating the images pointwise, in radiometric criteria, originating from noise in the image, from possible weak structuring of the image, difference in content in the images, the procedure for calculating the matching, etc.

2) System errors which occur in the match between the angular deviations of the line of sight and the residuals measured in terms of pixel coordinates, that are due to inadequate knowledge of the geometric modeling of the system.

3) Errors in the procedure which allows the calculation of the angular deviations (Wiener or Kalman filtering, least squares or the like).

The measured residual, denoted by the function $Res\Theta_1/\Theta_2$, builds in the errors listed above, plus the attitude variation errors that one wishes to measure.

The approach followed consists in translating the effect of each of the errors in the measurement of residual into a pixel equivalent and to deducing from this the angular estimation error, while neglecting the causes of errors that have been found to be the weakest.

Each of the components di and dj of the residual function is considered to be a scalar function. These functions may be analyzed by linearization about the origin point:

$$di(M_1) = Ei(M_1) + \sum_\theta \frac{\partial di}{\partial \theta}(M_1) \cdot d\theta$$

$$dj(M_1) = Ej(M_1) + \sum_\theta \frac{\partial dj}{\partial \theta}(M_1) \cdot d\theta$$

where
Ei and Ej are the matching errors made by H,
dθ denotes the uncertainty in the knowledge of any parameter θ in $\Theta_1$ and $\Theta_2$, $$\frac{\partial di}{\partial \theta} \text{ and } \frac{\partial dj}{\partial \theta}$$

are the sensitivities of the residual to the uncertainty dθ at the point $M_1$.

It has been verified that a roll variation creates an offset in the row direction but hardly at all in the column direction, that a pitch variation creates practically only an offset in the row direction, that a yaw variation is practically sensitive only at the edge of the field and in the column direction and can be neglected, that the coefficients of sensitivity to angular variations depend relatively little on the sighting angle which gives rise especially to a quasi-constant offset column-wise.

It has also been verified that the other causes have an effect that is proportional to the acquisition time interval (that is to say to the distance between detection strips) and that many of their effects are negligible, insofar as the off-boresighting is weak.

To reduce the amount of calculation, the method will generally use a first-order linear modeling and a first-order approximation of the model.

1st Order Linear Modeling of the Residual

The linearization of the residual consists in approximating it according to the following linear formulation:

$$di = \sum_\theta C_i(j) \cdot d\theta + Ei_{meas} + Ei_{lin}$$

$$dj = \sum_\theta C_j(j) \cdot d\theta + Ej_{meas} + Ej_{lin}$$

where
$E_{meas}$ are the image matching errors
$E_{lin}$ are the linear modeling errors
The coefficients C depend on the off-boresighting and on the position of the characteristic point in the field.

1st Order Approximation of the Model

Insofar as one is not seeking to resolve ambiguities, the linear modeling is reduced, to 1st order, to:

$$di = C_{\Delta T}(j) \cdot d\Delta T + C_{\Delta T}(j) \cdot d\Delta L + C_h(j) \cdot dh + Ei_{meas} + E_{lin} + Ei_{1storder}$$

$$dj = C_{\Delta R}(j) \cdot d\Delta R + Ej_{meas} + Ej_{lin} + Ej_{1storder} \quad (2)$$

where $E_{1storder}$ are the errors related to this new approximation.

3—Attitude Restoration by Harmonic Analysis

Having performed:
 the calculation of the homologous points by image processing,
 the corresponding angular estimates,
estimates are available of the angular variations, over a given time interval, of the attitude of the satellite about the three axes, regularly sampled during this interval.

The attitude of the satellite still needs to be restored.

Here, each axis is processed independently. The following notation will be used:
θ(t) the attitude corresponding to one of the three axes and Δθ(t)=θ(t+τ)−θ(t)

the measurable angular variation.

An estimator of θ(t) will be defined on the basis of the measurements of Δθ(t) and its characteristics in terms of transfer function. Its performance will then be indicated.

Figure 6:
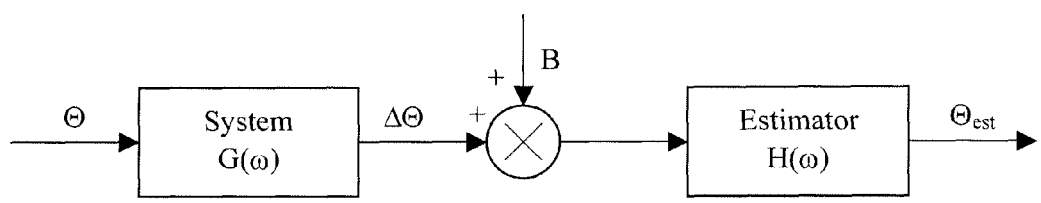
FIG. 6 is a basic diagram of the third step of the method.

The system may be schematized as in FIG. 6, where $\theta_{est}$ is the value of θ estimated by the process, H(ω) denotes the estimator and B corresponds to the measurement error (correlation error, parallax, geometric model residuals).

This is a deconvolution problem consisting in estimating parameters on the basis of measurements arising from a spatially invariant linear system that can be modeled by a convolution equation, that is to say this is a harmonic analysis.

The estimator may in particular be formulated as a pseudo-inverse filtering in Fourier space:

θ(t)→F(θ(t))=Θ(ω)

θ(t+τ)→F(θ(t+τ))=$e^{j\omega\tau}$·Θ(ω)

Hence we have: G(ω)=$e^{j\omega\tau}$−1
The theoretical associated inverse filter is:

$$H_{inverse}(\omega) = \frac{1}{e^{j\omega\tau} - 1}$$

The problems to be solved when processing in this way are due to the fact that:
 The function G vanishes for the frequencies ω=2·π·n/τ, where n is any integer. At these frequencies, the inverse filter is not defined.
 Near these frequencies, the filter gain takes very sizeable values which considerably enhance the noise.

To alleviate the limits of the simple inverse filter it is possible to use other filtering techniques, better able to limit the impact of noise, such as Wiener filtering or Kalman filtering. Here we detail the use of Wiener filtering.

Wiener theory leads to the definition of a filter that is optimal in the sense of minimization of the mean square error. In the case where the measurable signal Δθ results from a stationary and ergodic random process and where the signal and the measurement noise are decorrelated, the equation for the filter in the frequency domain is:

$$H_{Wiener} = \frac{\overline{G}}{|G|^2 + \frac{P_B}{P_\theta}}$$

where $P_\theta$ and $P_B$ are respectively the power spectral densities of the signal to be restored and of the noise. These two functions are not known a priori. They may either be estimated (recursive algorithm), or be modeled, or be considered constant.

It will often be possible to adopt the third assumption which leads to the following pseudo-inverse filter:

$$H_k = \frac{\overline{G}}{|G|^2 + k}$$

This then yields:

$$H_k(\omega) = \frac{e^{-j\omega\tau} - 1}{2 \cdot (1 - \cos\omega\tau) + k}$$

And the gain of the chain is:

$$F_k(\omega) = G(\omega) \cdot H_k(\omega) = \frac{2 \cdot (1 - \cos\omega\tau)}{2 \cdot (1 - \cos\omega\tau) + k} \quad (3)$$

It is seen that the estimator introduces no phase shift.

Figure 7:
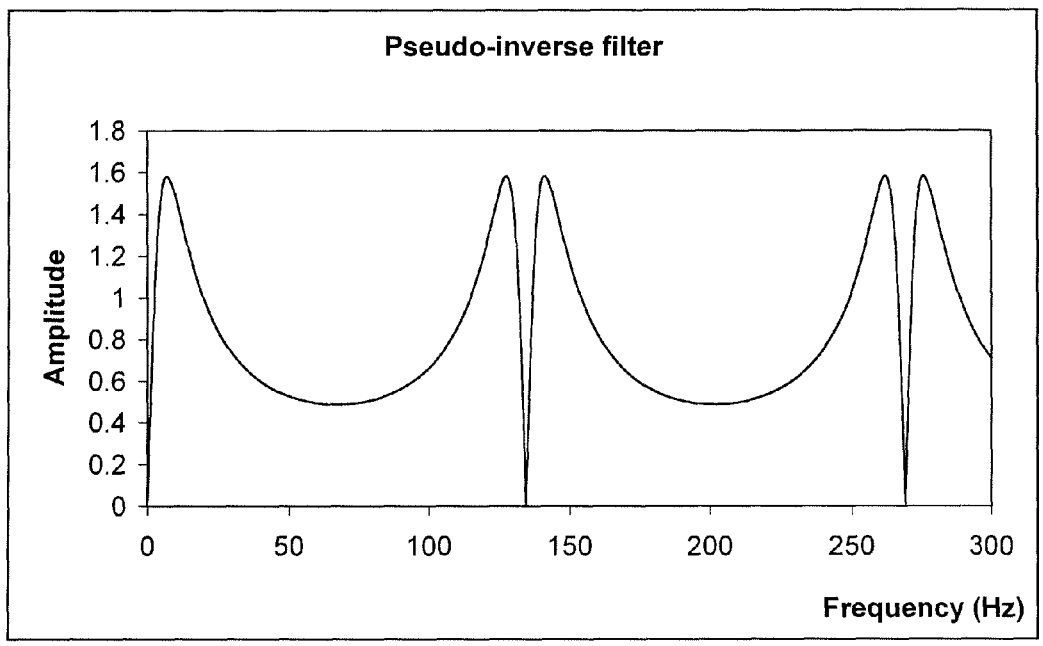
FIGS. 7 and 8 show the characteristics of a pseudo-inverse estimation filter that can be used by this third step.
Figure 8:
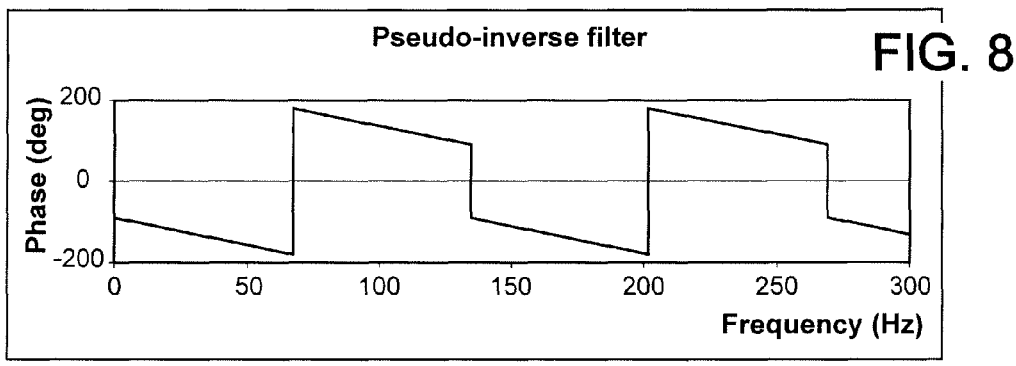

FIGS. 7 and 8 show the characteristics of the Wiener estimation filter obtained using the following parameters:
measurements at a sampling frequency fe>100 Hz
duration of variation (time interval between two consecutive bands): 7.44 ms (134.4 Hz)
noise attenuation coefficient k: 0.1

It is found that the Wiener filter cuts off all the harmonics of frequency $n \cdot f_\tau$ because of the fact that at these frequencies there is no signal. The inverse filter tends to diverge despite the choice made for k, the effect of which is shown in FIGS. 9 and 10 with the same other parameters as in FIGS. 7 and 8.

A sizeable value of k corresponds to a measurement noise level for the angular variation that is sizeable with respect to the signal level (initial error in the knowledge of this variation). The filtering of the data is stronger and the cutoff bands are wider.

The increase in k moreover decreases the gain of the complete processing chain.

Figure 9:
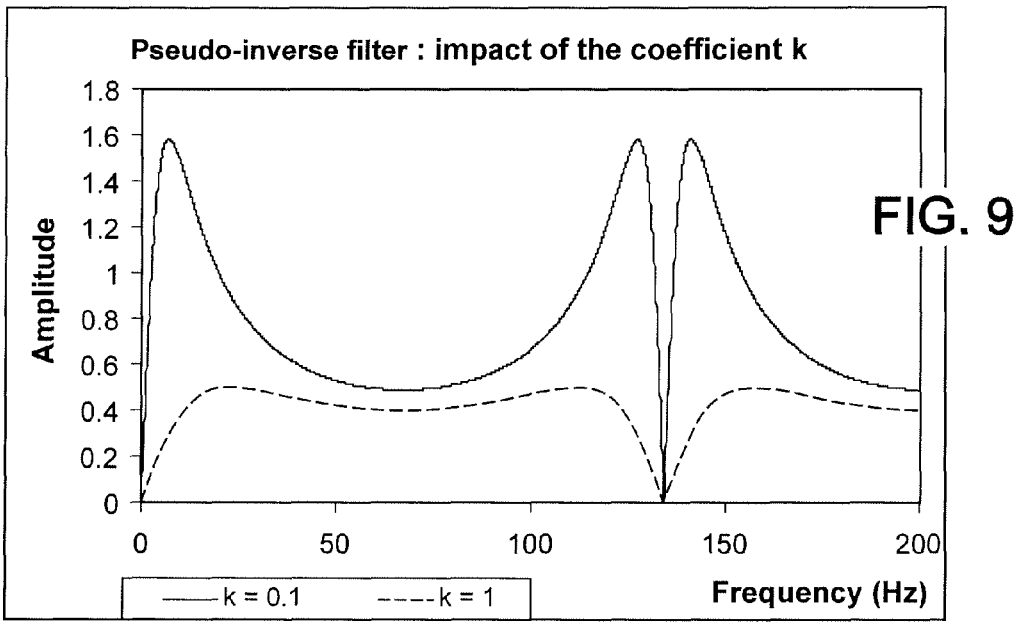
FIGS. 9 and 10 show the effect of the noise attenuation coefficient on the characteristics of a pseudo-inverse filter.
Figure 10:
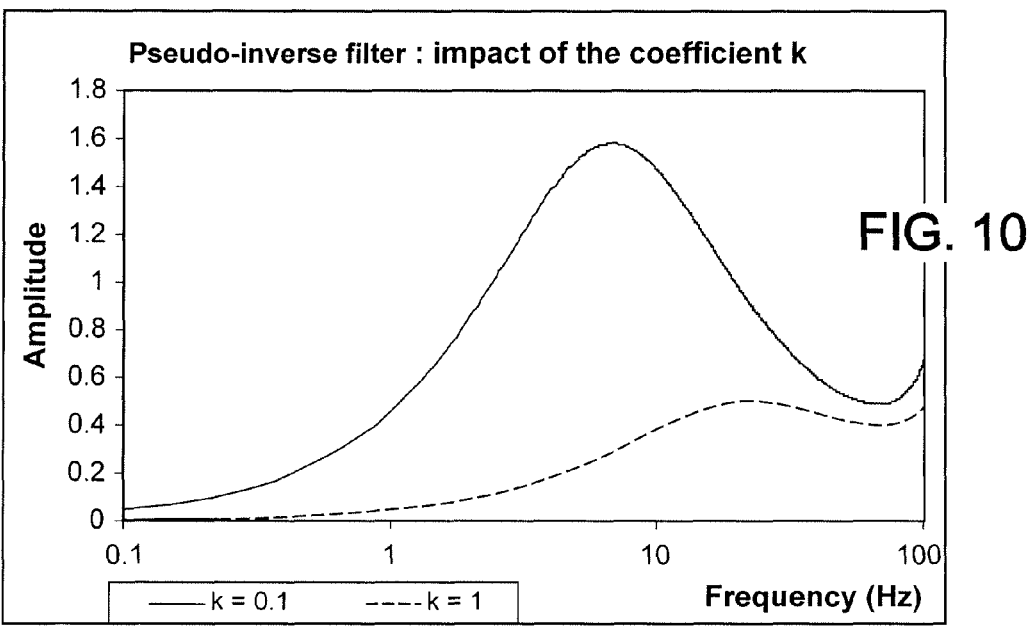
Figure 11:
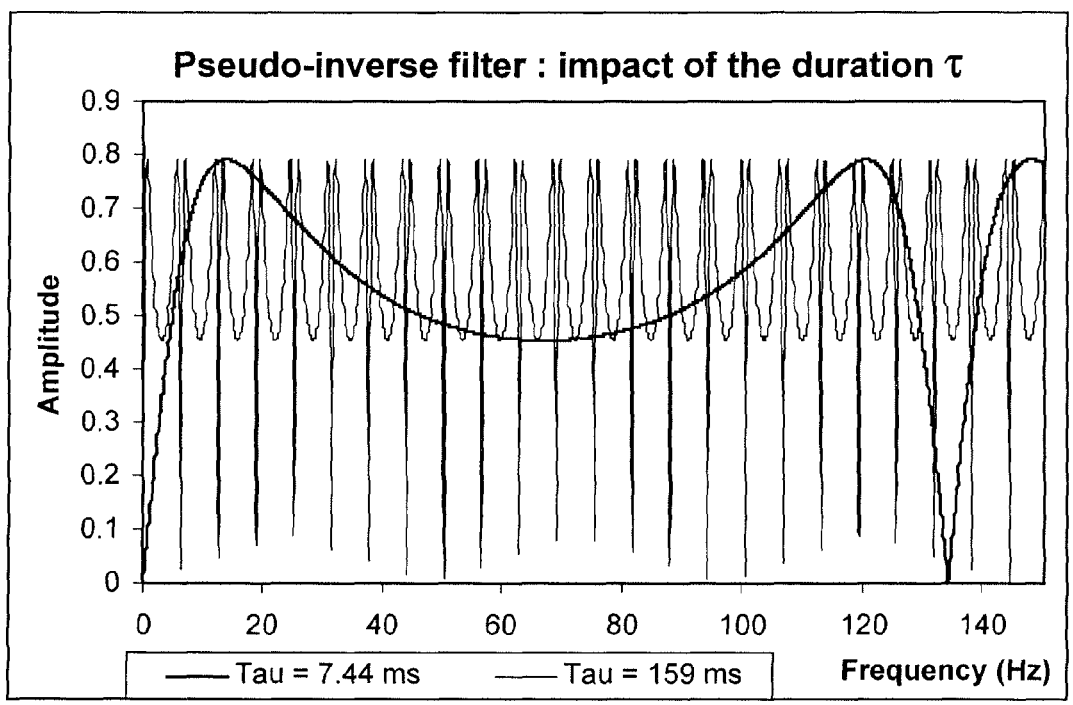
FIGS. 11 and 12, similar to FIGS. 9 and 10, show the effect of the time offset τ.
Figure 12:
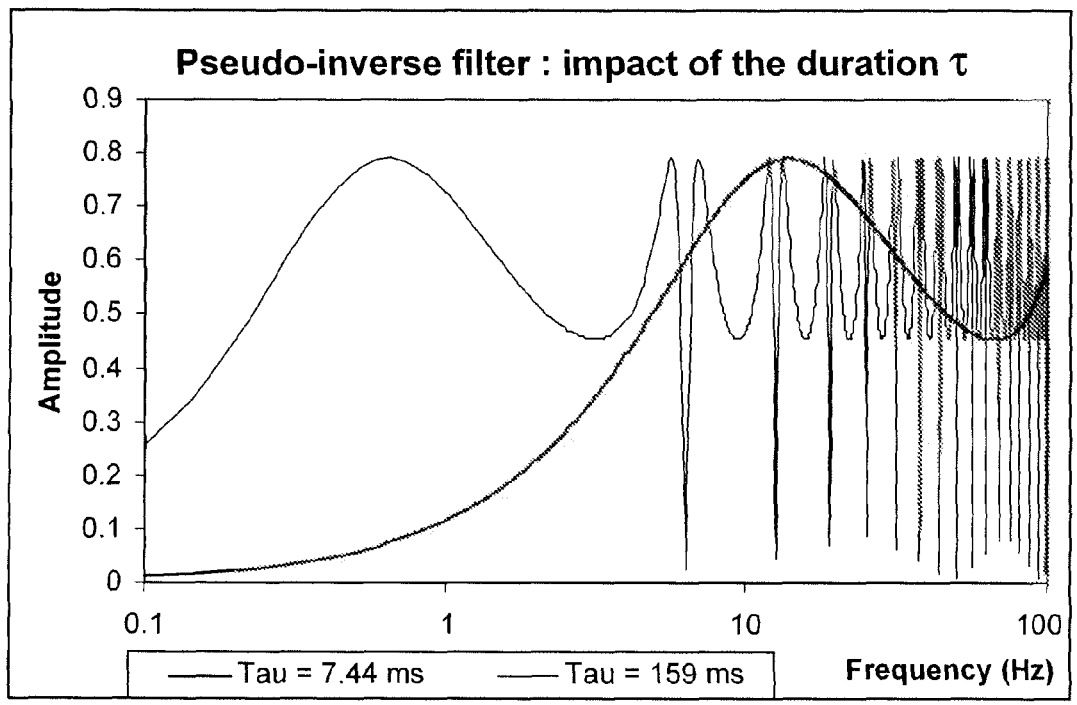

The influence of the time interval τ between the acquisitions has also been determined with the same parameters as in FIGS. 9 and 10 by varying the value of τ. FIGS. 11 and 12 show the cutoffs at the frequencies n/τ. The more one wishes to increase the frequency, the more necessary it is to take a small value of τ. However, the width of the cutoff bands also increases, especially for the low frequencies which demand a small value of τ. A like effect is found in the gain and a compromise will generally be necessary.

The analysis just undertaken shows that the restorable frequency band depends essentially on two time parameters:
the period Te of the measurements,
the duration τ between the two acquisitions of one and the same point (usually between two spectral bands).

The way in which the restorable frequency band may be estimated as a function of the various parameters of the instrument will now be indicated on the basis of an example.

PAN/B1: τ~150 ms According to Shannon's theorem, it is not possible to restore frequencies above fe/2=1/2·Te. In practice, a margin of a factor of 2 is usually taken. Assuming that one measurement per line is available (of period Te), it may be deduced from this that the maximum restorable frequency is theoretically 1/(4·Te) Hertz. However, the measurements based on image correlation are intrinsically filtered on account of the size of the correlation vignette.

For example, if the height of the vignette is 10 lines, the time constant is then 10×Te, i.e. a cutoff at 1/(10·Te) Hz.

Moreover, in the frequency band thus defined by the sampling period for the measurements, the differentiation over a time interval τ introduces narrower bands between which the signal is cut off. A compromise or a combination is necessary. In actual fact, a large value of τ allows a descent to lower frequencies, but with narrow bands. Conversely, a low value of τ gives wide bands, but does not allow the low frequencies to be restored.

Figure 13:
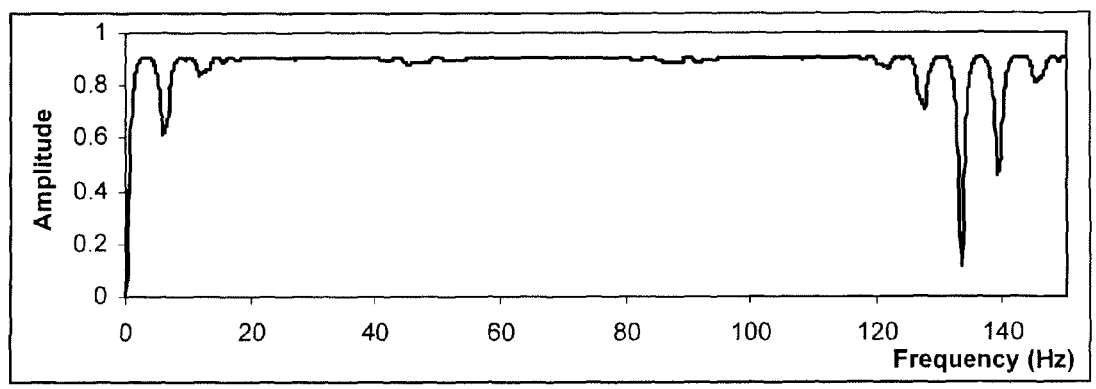
FIG. 13 shows the effect obtained on restitution of the combination of several pairs of images.

In the example of 4 bands denoted PAN, B0, B1, B2, the set of the following pairs may be considered:
PAN/B2: τ·172.2 ms
B1/B2: τ~22.2 ms
B1/B0: τ~7.4 ms
B2/B0: τ~14.8 ms The restorable band can then be defined by the maximum value of the elementary bands. FIG. 13 shows how, by combining the available image pairs, it is possible to restore the signal in a wide band.

II—Details of the Steps

Additional indications will now be given regarding the implementation, in the case of images obtained with a detector operating in "push broom" mode and with a 2D matrix detector.

1. Image Matching

Image matching involves, for a certain number of "characteristic points" of an image, searching for their homologous points in the other images, by utilizing the resemblances in the vicinity of the points in the various images.

The matching errors have various origins:
The radiometric quality of the images,
The geometric quality of the images (local mapping of the focal plane, movements of the line of sight, terrestrial relief and parallax effects),
The radiometric information: spectral content, structure of the vicinity of the characteristic point.

The movement of the line of sight has a different impact on the matching performance depending on the image acquisition mode.

In the case of push-broom, the column direction is also a time dimension. Now, the matching is performed over a two-dimensional zone (vignette) in the vicinity of a point. It contains the movements of the line of sight over the duration of its acquisition. The correlation operates like a filtering on the signal that one seeks to measure. This problem does not exist in the case of matrix detectors.

As far as the matching is concerned, the algorithms that may be envisaged comprise image correlation, filtering, Fourier transform based approaches or wavelet decomposition based approaches.

In practice it is preferable to employ at least ten or so homologous points for each image line, the points being far enough apart column-wise for the matching errors to be independent.

The angular variation can be calculated for each of the image lines, hence at the same temporal sampling stepsize as the image lines. Each sample is therefore affected by noise, which is decorrelated, originating from the image matching error.

2. Estimation of the Angular Variations

The image matching makes it possible to obtain a certain number of pairs of homologous points that are defined with regard to an essentially radiometric criterion. The geometric modeling of the system makes it possible to obtain a prediction of these homologous points. Algorithms of location/inverse location type may be used for this purpose. The residual (differences between the predicted point and the correlated point) corresponds to the errors in the knowledge of these parameters, and to the approximations made by the model. Estimation of the attitude variations requires that these contributions be separated from the other contributions (instrument model, parallax, etc.).

The processing may be carried out at each homologous point, or globally over the whole width of the field.

The second solution has the advantage on the one hand of performing a certain filtering on the measurements, and on the other hand of exploiting the image invariants relating to the rigidity of the focal plane and to the fact that the movement of the sighting frame is the same regardless of the point of the field considered. A calculation of the least squares estimation type may be used as an instantaneous estimate of the attitude variation.

The matching provides the "absolute" pixel coordinates of the points in an image, as well as the coordinates of the homologous points in the other image. This match is difficult to utilize if references are not available.

A reference can be calculated by predicting the point using the best geometric knowledge of the system. The residual is then the deviation between the two points. It includes all the errors related to this knowledge, except for the known geometric effects.

One may seek to restore:
the orientation of the sighting frame, or
the direction of sighting at one or more field points.

The residual is estimated by formulae (I) already mentioned:

$$Res\Theta_1/\Theta_2(M1(i_1,j_1))=M_2 \cdot M'_2=(di,dj)=(i'_2-i_2, j'_2-j_2)$$

with $M_2(i_2, j_2) = Loc^{-1}\Theta_2 \circ Loc\Theta_1(M1(i_1,j_1))$ $M'2(i'_2, j'_2) = H(M1(i_1,j_1))$ homologous point provided by image correlation The effects related to inadequate knowledge of the absolute orientation are weak (but often not negligible) compared with the movement-related effects. This absolute orientation is not directly observable since its effects coincide with those related to the movement. Moreover, in certain axes, the sensitivity is very weak. As a result, the residual can be modeled to first order by the equations:

$$di = C_{\Delta T}(j) \cdot d\Delta T + C_{\Delta L}(j) \cdot d\Delta L + C_h(j) \cdot dh + Ei$$

$$dj = C_{\Delta R}(j) \cdot d\Delta R + Ej$$

which constitute a simplification of equations (2) already mentioned.

Time synchronization is necessary.

In the case of push-broom acquisition, the points acquired at the same instant lie on the same line. On the other hand, such is not necessarily the case for their homologs, on account of the non-parallelism of the acquisition planes, of the rotational movements about the sighting axis, of the geometrical projection effects. As a result, the interval between two acquisitions is not strictly constant along the line.

The problem may be avoided when using detection matrices.

If a set of homologous pairs is available such that all the points of image 1 are acquired at the same instant t, that is to say are distributed along the line i, their homologous points are not necessarily on the same line of image 2 and are not acquired at the same instant.

Let $t+\tau'$ be the instant of acquisition of one of the points in image 2. It will be assumed that $\tau'$ is close to a reference interval $\tau$.

It then follows that:

$$dj(t,t+\tau')=dj(t,t+\tau)+dj(t+\tau,t+\tau')=C_{\Delta T}(j) \cdot d\Delta R(t,t+\tau) + C_{\Delta T}(j) \cdot d\Delta R(t+\tau,t+\tau') + Ej$$

By linearization, it is considered that $d\Delta R(t+\tau,t+\tau') \sim (\tau'-\tau) \cdot d(dR/dt)(t+\tau)$ This approximation is justified when the interval between $\tau$ and $\tau'$ is short and the rotation speed is almost constant and equal to that for the instant $t+\tau$.

$$dj(t,t+\tau')=C_{\Delta T}(j) \cdot d\Delta R(t,t+\tau) + C_{\Delta T}(j) \cdot (\tau'-\tau) \cdot d(dR/dt)(t+\tau) + Ej$$

Two cases arise:
in a first case, the values $\tau'$ for all the homologous points are very close; then $d(dR/dt)(t+\tau)$ is not observable, on the other hand, it is easy to calculate $d\Delta R(t,t+\tau')$ as the average of the $dj(t,t+\tau')/C_{\Delta T}(j)$. When $\tau' \neq \tau$, if the estimation filter operates with a constant time interval value equal to $\tau$, it is necessary to perform a compensation. As $d(dR/dt)(t+\tau)$ is not known since it involves the error in the knowledge of the movement, expressed as a speed, it is approximated by $d\Delta R(t,t+\tau)/\tau$. A synchronized model is then obtained for the residual defined by:

$$dj(t,t+\tau')=C_{\Delta T}(j) \cdot (\tau'/\tau) \cdot d\Delta R(t,t+\tau) + Ej + Ej_{sync}$$

where $Ej_{sync}$ is the error made during the synchronization operation.

in a second case, the system is invertible, and the estimate may be made by a conventional least squares procedure.

Line-wise, the same reasoning leads to the solving of the equation:

$$di(t,t+\tau')=\alpha(j) \cdot d\Delta T(t,t+\tau)+\alpha(j) \cdot (\tau'-\tau) \cdot d(dT/dt)(t+\tau)+\beta(j) \cdot d\Delta L(t,t+\tau)+\beta(j) \cdot (\tau'-\tau) \cdot d(dL/dt)(t+\tau)+\gamma(j) \cdot dh + Ej$$

in the case of an invertible system.

In the converse case, the equation reduces to:

$$di(t,t+\tau')=\alpha(j) \cdot (\tau'/\tau) \cdot d\Delta T(t,t+\tau)+\beta(j) \cdot (\tau'/\tau) \cdot d\Delta L(t,t+\tau)+\gamma(j) \cdot dh + Ej + Ej_{sync}$$

The sensitivity coefficients may be calculated numerically at each point of the focal plane, and at each instant, by using the best knowledge of the system available. Two homologous points are calculated in image 2 corresponding to one and the same point in image 1, by varying one of the parameters very slightly.

$$\frac{\partial di}{\partial \theta}(M_1) \approx \frac{i'_2 - i_2}{d\theta}$$

$$\frac{\partial dj}{\partial \theta}(M_1) \approx \frac{j'_2 - j_2}{d\theta}$$

The parallax has a sensible effect essentially in the column direction. The system of equations defined for each homologous point may be written in the form:

$$di = \alpha(j) \cdot d\Delta T + \beta(j) \cdot d\Delta L + \gamma(j) \cdot dh(j) + Ej$$

where h is the height.

It cannot be solved if, at each new homologous point, the lack of knowledge of its altitude is a new unknown.

Insofar as $\alpha(j)$ is almost constant and $\beta(j)$ is almost linear, the following simplified equations can then be solved:

$$di = \alpha(j) \cdot d\Delta T + \beta(j) \cdot d\Delta L + Ej,$$

which amounts to estimating the altitude at each point, along the line, to within a linear component which corresponds to a lack of knowledge of the average slope along the line:

$$dh_{est} = dh_{real} + A_h + j \cdot B_h$$

By making this approximation it is assumed that this average slope is zero, which may be considered to be reasonable if a minimum of information is available about the relief.

There are 2 parameters to be estimated column-wise and 4 row-wise. However, a pair of homologous points gives an item of information in two dimensions only. As a result, at least 4 pairs are required in order to make an estimate. In practice more will be used, thus enabling the correlation errors to be filtered, while taking account, however, of the increase in the calculation time and insofar as a sufficient number of characteristic points is available. Moreover, it is desirable for there to be points spaced apart in the field to allow good yaw estimation.

III—Integration and Time Filtering

Two approaches are possible for the integration and time filtering of the measurements that allow fine attitude restoration to be achieved.

The first consists in refining the attitude profile restored in a conventional manner, for which an error model is given, by estimating the parameters of this error model.

The second approach consists in reusing all the valid attitude measurements arising from the various sensors when they are available, and in redoing a complete ground estimate, this time associating the image measurements therewith. Regardless of the approach, the problem is one of signal processing for which algorithms such as Wiener filtering or statistical filtering, the least squares procedure, etc., are available.

Some examples will now be described.

Wiener Filtering:

Wiener theory applied here leads to the estimation filter whose gain is given by formula (3) already mentioned.

$$F_k(\omega) = G(\omega) \cdot H_k(\omega) = \frac{2 \cdot (1 - \cos \omega \tau)}{2 \cdot (1 - \cos \omega \tau) + k} \quad (3)$$

Such a filter leads to an error in the estimate $E(\omega)$ due essentially to two contributors: the measurement noise and the estimation bias introduced by the coefficient k.

The results of analyzing the effect of the noise show that the gain in the restitution performance in the presence of "white" measurement noise does not depend on the interval τ.

Analysis of the effect of k shows that the performance of the filter passes through an optimum for a given value of k. If k is too small, the measurement noise is too greatly amplified. If k is too large, the signal to be restored is overly filtered. Theoretically the optimum value of $k=1/SNR^2$, in the case of two sources of white noise. In practice, the signals (useful signal and error signal) are much more complex than simple white noise. If the Wiener approach is adopted for restitution, the coefficient may be optimized based on simulations.

If the signal to be restored is "colored" noise (white cut off at a frequency fc or $\omega_c$) the power spectral density PSD is given by:

$$PSD_\Theta(\omega) = \sigma e^2 \cdot (\omega_e/2\omega_c)^2 \cdot \delta(\omega < \omega_c)$$

$$PSD_{Eest}(\omega) = |F_k(\omega) - 1|^2 \cdot PSD_\Theta(\omega)$$

$$\sigma_{Eest} = [\phi_{Eest}(0)]^{1/2} = \phi_\Theta \cdot (\omega_e/2\omega_c) \cdot [\mathfrak{I}^{-1}/|F_k(\omega)-1|^2 \cdot \delta(\omega<\omega_c)](0)]^{1/2}$$

where $\omega_e$ is the sampling frequency, and $\delta(\omega<\omega_c)$ equals 1 for $\omega<\omega_c$, and is zero elsewhere. The optimal coefficient k is of the form:

$$k = a/SNR^2$$

The low frequencies exhibit the problems of gyros, namely long-term drifting: any measurement error at low frequency (bias or slow variation), even a small one, may take sizeable proportions owing to the integration.

To restore the low frequencies, it is possible to use measurements of attitude variation over a long duration τ and to decrease the coefficient k of the filter. This can be done only if the measurement noise is reduced, by filtering beyond a frequency below the first cutoff of the Wiener filter (1/τ).

Least Squares Procedure

The least squares procedure, by estimating the parameters of a polynomial modeling of the signal, enables the low frequencies to be processed in the best possible way.

It is first appropriate to formulate a low-frequency estimator based on least squares.

If θ(t) is modeled by means of a polynomial model, for example:

$$\theta(t) = \theta_0 + \theta_1 \cdot t + \ldots + \theta_n t^n + \epsilon(t)$$

the signal to be measured equals:

$$\Delta\theta(t) = \theta_1 \cdot \tau + \theta_2 \cdot [(t+\tau)^2 - t^2] + \ldots + \theta_n \cdot [(t+\tau)^n - t^n] + \Delta\epsilon(t)$$

The continuous component is not restorable.

With the formulation: $\Theta = (\theta_1, \theta_2, \ldots, \theta_n)$, and $\tau(t) = (\tau, [(t+\tau)^2 - t^2], \ldots, [(t+\tau)^n - t^n])$ If k1 measurements are available: $\Delta\theta_i = \Delta\theta_{meas}(t_i)$ for i between 1 and k1.

We have: $\Delta\theta_i = \tau(t_i)^T \cdot \Theta + \Delta\epsilon(t_i) + \epsilon_{meas\ i}$ The following notation is used:

$$\Delta\Theta = (\Delta\theta_1, \Delta\theta_2, \ldots, \Delta\theta_k),$$

$M_\tau$ = matrix of the k rows $\tau(t_i)$
$B = (\Delta\epsilon(t_1) + \epsilon_{meas\ 1}, \ldots, \Delta\epsilon(t_k) + \epsilon_{meas\ k})$ The measurement equation may then be written: $\Delta\Theta = M_\tau \cdot \Theta + B$ The optimal solution, in the weighted least squares sense, is then given by:

$$\Theta_{est} = (M_\tau^T \cdot \Gamma_{meas}^{-1} \cdot M_\tau)^{-1} \cdot M_\tau^T \cdot \Gamma_{meas}^{-1} \cdot \Delta\Theta$$

where $\Gamma_{meas}$ is the covariance matrix $E(B \cdot B^T)$

Only the error in the estimate of $\theta(t) - \theta_0$ can be characterized:

$$\sigma^2_{est}(t) = E[(\theta_{est}(t) - \theta(t)) \cdot (\theta_{est}(t) - \theta(t))^T] = T(t) \cdot \Gamma_{est} \cdot T(t)^T$$

with $T(t) = (t, t^2, \ldots, t^n)$

Here, a relative error is characterized given that at each origin instant t=0, hence $\sigma_{est}(t) = 0$, which implies that the error at this instant is put down entirely to the indeterminacy of $\theta_0$. As a result, the concept of estimation error will apply only to a limited time interval. The statistical values of $\sigma_{est}(t)$ over the (maximum and mean) duration of restitution may then be considered as dimensioning criterion.

Assumptions for performance estimation:

The k measurements are independent and have a standard deviation $\sigma_{meas}$.
The measurements are regularly sampled with a stepsize Te at the instants: $t_i = i \cdot Te - t_0$
This gives: $\Gamma_{meas} = \sigma^2_{meas} \cdot I_d$ and $\Gamma_{est} = \sigma^2_{meas} \cdot (M_\tau^T \cdot M_\tau)^{-1}$
The performance is then provided by the statistical values (mean and maximum value) over the duration of the image sequence (or of the segment) of the gain:

$$\sigma_{est}(t)/\sigma_{meas} = [T(t) \cdot (M_\tau^T \cdot M_\tau)^{-1} \cdot T(t)^T]^{1/2}$$

A gain of around 1 makes it possible to achieve attitude restitution performance similar to the performance in measuring initial angular variations. One will seek to keep this gain systematically below 10, if the analogy is made between the image correlation error (typically 0.1 pixels) and the allowable attitude restitution error (typically 1 pixel).

The error is practically insensitive to anything other than the time parameters, gap τ, sampling stepsize Te and restitution horizon n·Te (n being the number of measurements).

Figure 14:
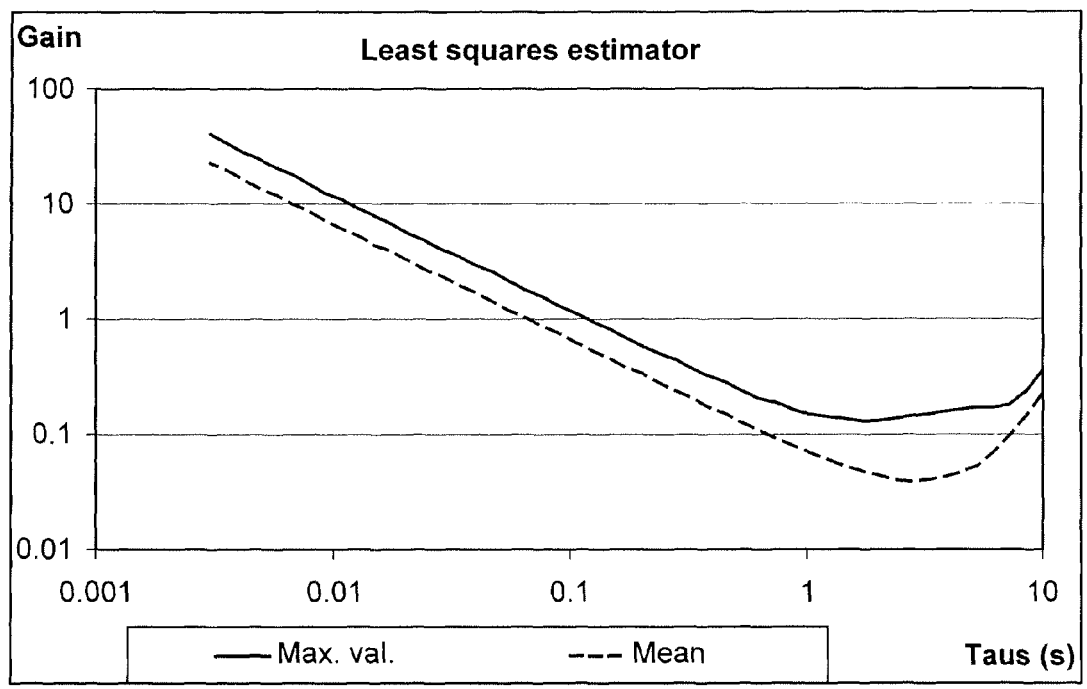
FIG. 14 shows the effect of the time offset τ on the ratio of the restitution accuracy to the measurement error.

The variation in the gain (ratio of the restitution accuracy to the measurement error as a function of τ is indicated in FIG. 14 for:
  line sampling period of 0.5 ms
  one independent measurement every 10 lines,
  Duration of an image sequence: 12000 lines, i.e. 6 s, thus making available (1200 measurements)
  Estimation using a polynomial with five coefficients The gain values shown in FIG. 14 are mean and maximum values of $\sigma_{est}(t)/\tau_{meas}$ over the 6 s duration of observation.

A quasi-linear decrease in the gain as a function of τ is noted. Below around 10 ms, the performance becomes mediocre. The upturn in the gain for large values of τ corresponds to the fact that the low frequencies are no longer completely represented in the measurements, hence that the estimates of the polynomial coefficients of order greater than 1 become poor.

Additionally, τ cannot exceed or even approach the duration of observation, since image matching is no longer possible.

In conclusion, the low frequencies (other than the continuous component) may be restored correctly according to a polynomial model with:
  a sufficient number of measurements,
  a fairly large time gap between images, typically between 0.1 and 1 s
  a relatively low order of the polynomial model, in general not exceeding 5.

Figure 15:
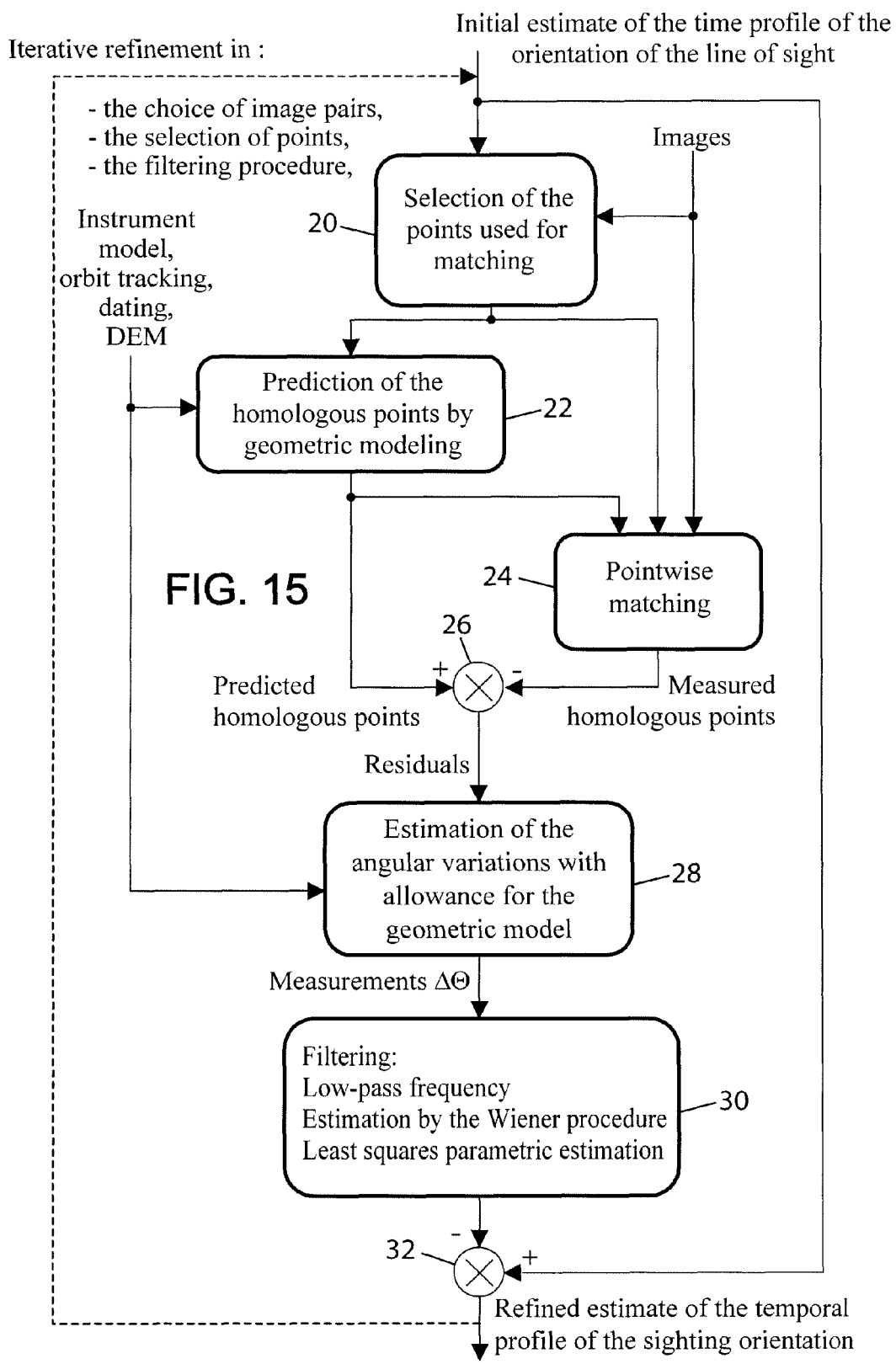
FIG. 15 is a logic flowchart of the method as a whole.

The line-of-sight orientation restitution processing is represented as a whole in FIG. 15 when using an iterative process for refining the estimate which enables various pairs of images to be taken into account, each pair possibly being associated with a specific time interval τ.

The step 20 of selecting the points to be correlated constitutes the start of an iteration. It may comprise a mechanism for rejecting false homologous points (arising from the previous iteration), so as to increase the robustness of the processing to matching errors. The process is initialized with an initial estimate consisting of the best knowledge of the sighting orientation that is available. This knowledge may arise from gyroscopic measurements, from measurements provided by a star sensor, from the image sequence setpoint or from any hybridization of this information.

The prediction of the homologous points of one image with respect to the other is carried out in step 22 by a locating/inverse locating algorithm which may be that described hereinabove under the heading "model for locating in the image". This prediction takes account of the indications stored, such as the instrument model, the orbit characteristics, a numerical elevation model of the terrain observed.

The pointwise image matching, in step 24, is carried out by any type of matching algorithm that utilizes inter-image radiometric resemblance. The initialization of this matching, limiting the homologous points search zone, may be provided by the knowledge of the points predicted at 22. The size of the search zone is then determined by the accuracy of the predictor.

The residuals are provided by subtraction at 26. Estimation of the angular variations on the basis of the residuals is carried out in step 28 according to the algorithm given at II-2 "estimation of the angular variations".

Finally, step 30 of integration and filtering of the angular measurements is carried out according to the algorithms presented under the heading II-3 "integration and time filtering". The processing may be preceded by a low-pass filtering when the sampling frequency of the measurements is well above the frequencies in the movement of the line of sight, which is often the case. Such filtering makes it possible to smooth the measurements and to eliminate the high-frequency noise, the measurement noise. The refined estimate (and possibly the absolute orientation) of the line of sight can be restored from the initial estimate by a subtractor 32, the output of which may be looped back to the input of the processing.

The method described hereinabove finds a particularly advantageous application in calculating the orientation of the line of sight V of an optical picture-taking instrument 12 onboard a satellite 10, as already described hereinabove, with reference to FIG. 1, for a satellite 10 placed in a non-geostationary orbit, and provided with a nadir sighting instrument 12 taking images of successive portions of the terrestrial surface band 16 overflown and observed, by virtue of a detection assembly situated in the focal plane of the instrument 12 and comprising a two-dimensional matrix detector controlled in such a way as to take pairs of successive images exhibiting appreciable overlap.

Figure 18:
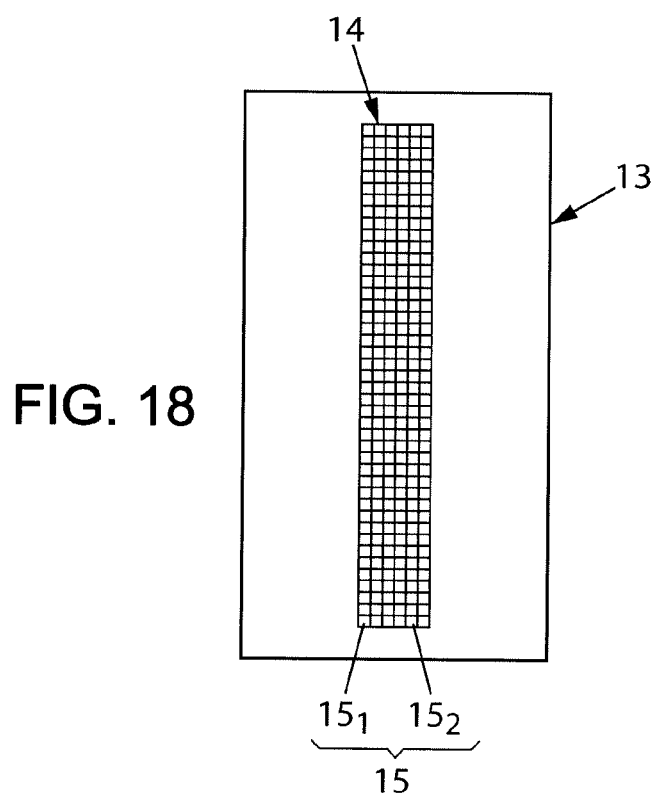
FIGS. 18, 19 and 20 represent three possible layouts of a detection assembly in the focal plane of the picture-taking instrument of the satellites of FIGS. 1, 16 and 17, respectively with a single multi-line strip-type detector, three multi-line strip detectors spaced apart, and a main multi-line strip detector, associated with a dedicated detector that is smaller than the main detector and spaced apart from the latter.

As a variant, and as represented in FIG. 18, the detection assembly in the focal plane 13 can comprise a single strip-type detector 14 typically having from one (but preferably from at least two) to a few tens of lines 15, which each comprise from 1000 to 10 000 pixels, for example, the strip operating on the so-called "push-broom" principle and being oriented in the direction of the lines of the image to be obtained, that is to say the strip 14 scans the scene observed in a direction perpendicular to its lines, the satellite 10 being pointed in such a way that this strip-type detector 14 scans the zone 16 to be observed during image sequencess. The method according to the invention is then applied to the pairs of successive images, as is defined hereinabove, or, as a variant, this method is applied to at least two images formed using at least two lines, for example $15_1$ and $15_2$, of the strip detector 14 of FIG. 18.

In the latter case, the choice of the at least two lines $15_1$ and $15_2$ used in the strip detector 14 to form the at least two images is optimized with a view to reconstructing the movements of the line of sight V in a given frequency band.

Figure 19:
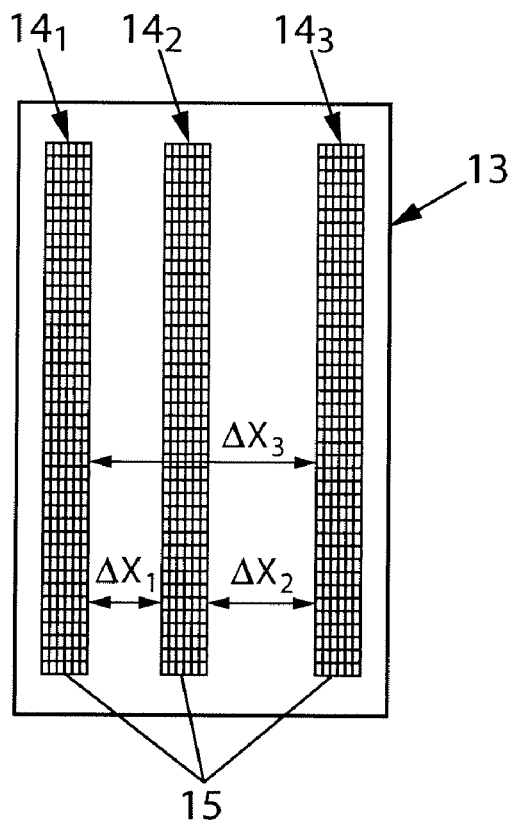

As a variant, as represented in FIG. 19, the detector assembly in the focal plane 13 of the non-geostationary orbiting satellite 10 of FIG. 1 can comprise several main strip-type detectors, for example three strip detectors $14_1$, $14_2$ and $14_3$ which are aligned, that is to say whose lines of pixels, on the basis of which the images to be processed according to the above method are formed, are parallel to one another from one strip to another, as therefore are the columns also, the strip detectors $14_1$, $14_2$ and $14_3$ being spaced apart in a direction perpendicular to their lines by spatial gaps AXE, between the two detectors $14_1$ and $14_2$, $\Delta X_2$, between the two detectors $14_2$ and $14_3$, and $\Delta X_3$, between the two detectors $14_1$ and $14_3$, so as to constitute three pairs of strips, the two strips of each pair being separated from one another by a distance such as $\Delta X_1$, $\Delta X_2$ or $\Delta X_3$, typically from a few fractions of a mm to a few mm in the focal plane 13, so that these spatial gaps result in temporal gaps in the image sequences to be processed according to the method. The strip detectors $14_1$, $14_2$ and $14_3$ thus observe approximately the same portion of the scene during an image sequence, with a time offset which depends directly on the distance $\Delta X_1$, $\Delta X_2$ or $\Delta X_3$ between the strip detectors $14_1$, $14_2$ and $14_3$ in the focal plane 13.

Furthermore, in this configuration of the detection assembly, each line 15 of the strip detectors $14_1$, $14_2$ and $14_3$ can form an image of the scene, and at least one subset of the images thus created by the set of detectors of the focal plane 13 may be processed according to the method of the invention so as to restore the orientation of the line of sight V of the optical instrument 12.

Figure 20:
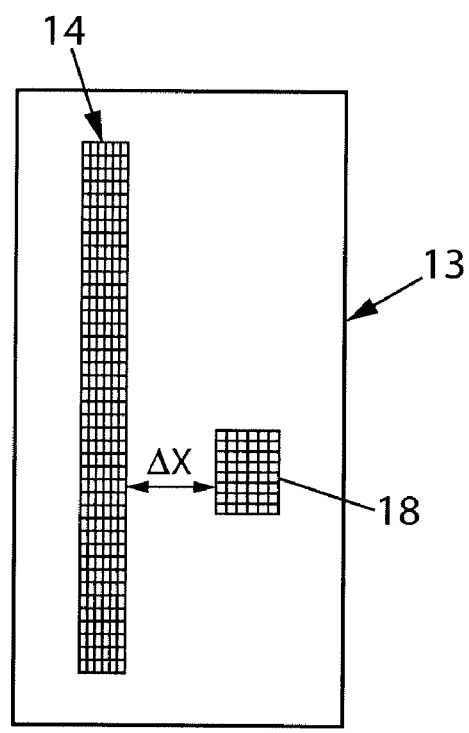

According to an alternative embodiment, the detection assembly in the focal plane 13 of this instrument 12 may consist, as represented schematically in FIG. 20, of a main strip-type detector 14, the number of lines and the number of pixels per line of which are appropriate to the use of this detector 14 for image capture according to desired characteristics of a mission, in terms for example of image quality, resolution and/or width of sweep and this main detector 14 is associated, in the focal plane 13, for the purposes of applying the method as defined hereinabove according to the invention, with at least one dedicated detector 18 of smaller size than the main detector 14 and consisting typically of a matrix of 100× 100 pixels or of a strip of 1000×10 pixels, and which is placed a certain distance $\Delta X$ from the main detector 14 and aligned in such a way that the rows and columns of the dedicated detector 18 are respectively parallel to the rows and columns of the main detector 14. With the aid of these two detectors 14 and 18, separated by a spatial gap $\Delta X$ resulting in a temporal gap in the image captures to be processed according to the method of the invention, it is possible to reconstruct movements of the line of sight V and, in the exemplary detection assembly in the focal plane according to FIG. 19 or FIG. 20, the spatial separation between the detectors $14_1$, $14_2$ and $14_3$ or 14 and 18, in the focal plane 13, can be optimized with a view to reconstructing the movements of the line of sight V in a given frequency band.

Figure 16:
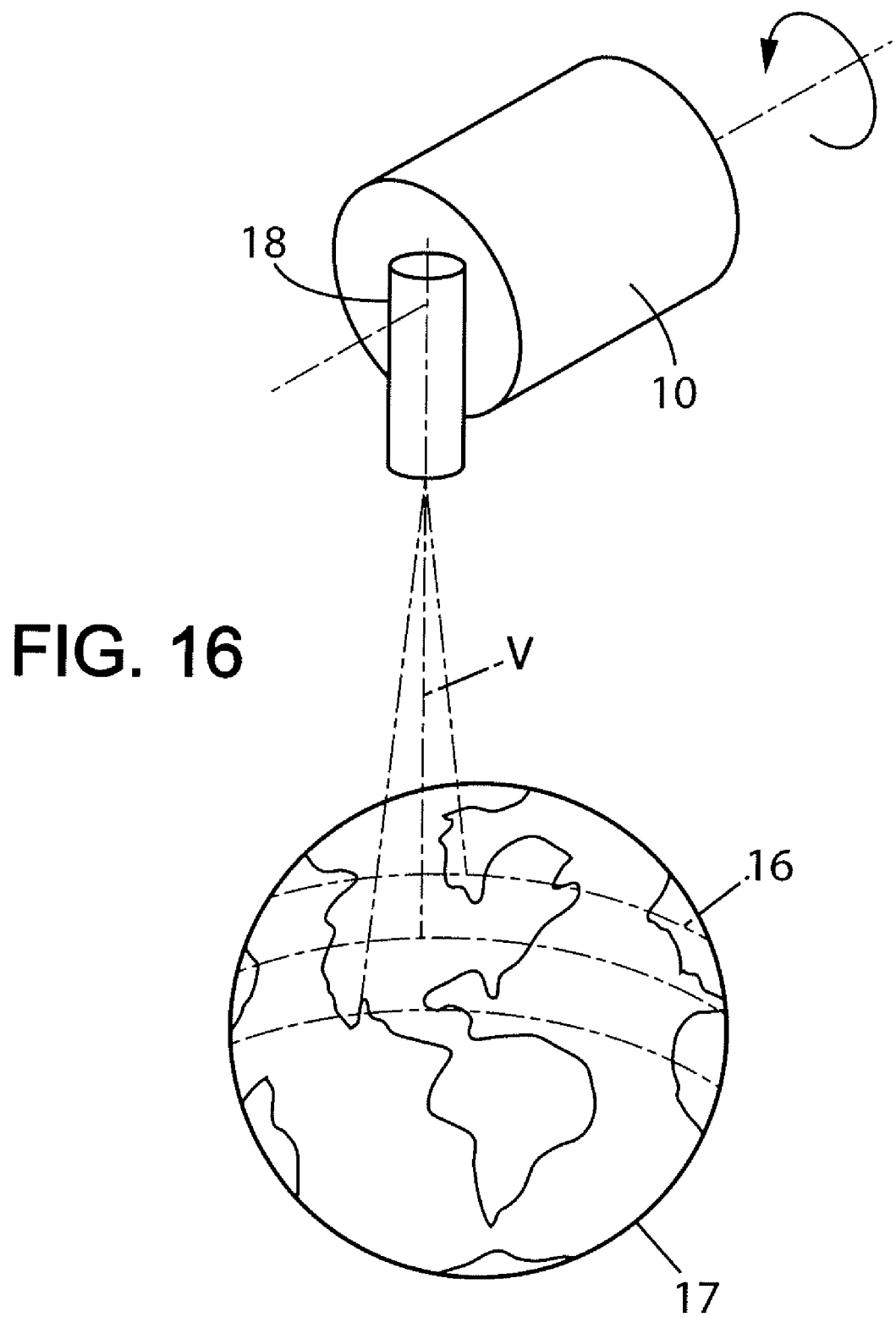
FIG. 16 is a view similar to FIG. 1, in respect of the formation of successive images of a band of terrain observed from a spinning satellite equipped with an optical picture-taking instrument.

The method of the invention can also be applied to calculating the orientation of the line of sight V of an optical picture-taking instrument 12 onboard a spinning satellite 10, as represented schematically in FIG. 16, stabilization of which is ensured by spinning about the axis of its cylindrical platform, so that the line of sight V of the instrument 12 is controlled in such a way that the detection assembly in the focal plane 13 of the instrument 12, and which may be an assembly according to one or other of FIGS. 18, 19 and 20, scans a surface band 16 of the terrestrial globe 17 by virtue of the spinning of the satellite 10.

Figure 17:
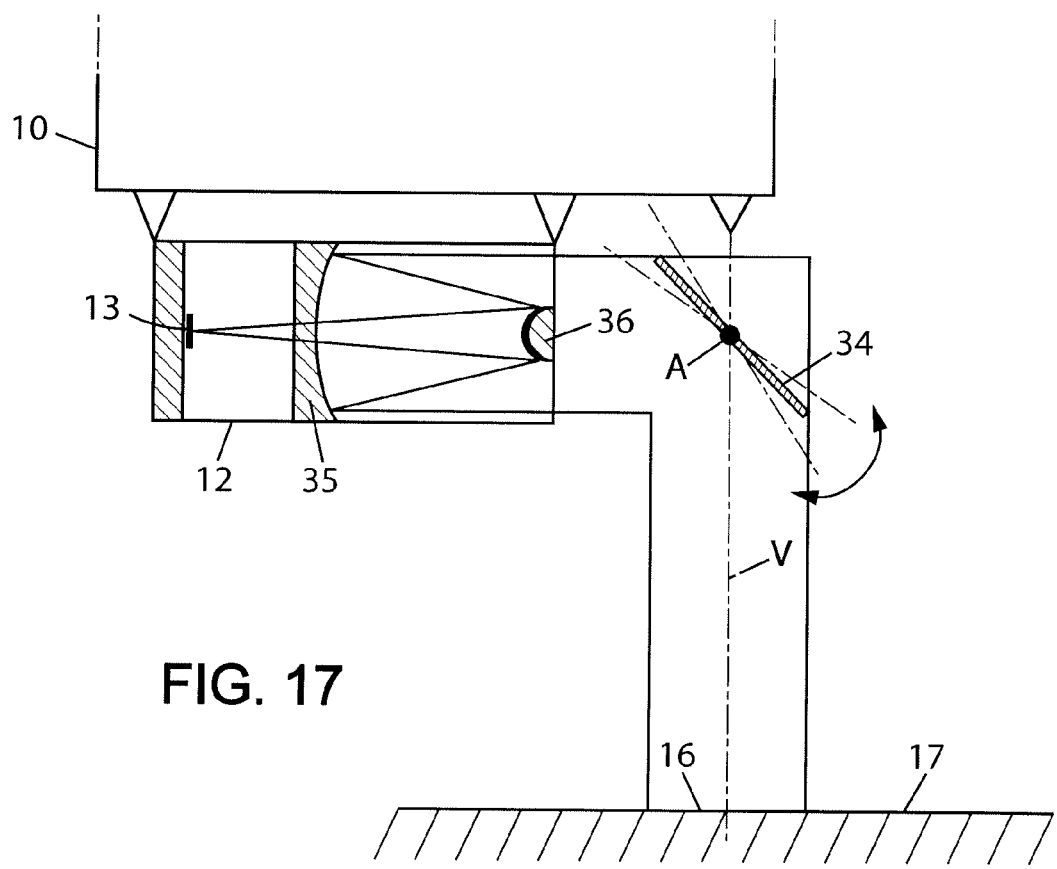
FIG. 17 is a view similar to FIG. 1 in respect of a non-spinning satellite equipped with an orientable mirror in the optical path of the optical instrument and scanning a band of terrain on the ground.

As a variant, as represented in FIG. 17, a band 16 of the surface of the terrestrial globe 17 may be scanned by the detection assembly at the focal plane 13 of the optical instrument 12 onboard a carrier satellite 10 using the scanning of an orientable mirror 34 placed in the optical path of the picture-taking instrument 12, the scanning mirror 34 oscillating, about a pivot axis A fixed with respect to the platform of the satellite 10, between two extreme positions shown chain-dotted, so as to reflect the image of the ground band 16 on a concave mirror 35 of the instrument 12, this mirror 35 reflecting this image onto a convex mirror 36 which itself focuses the image onto the detection assembly at the focal point 13, where the detection assembly may be one or other of the detection assemblies of FIGS. 18, 19 and 20, that is to say with a single strip-type detector, with several strip-type detectors aligned as at least one pair of spatially separated strips, and as an association of a main strip-type detector with a dedicated detector specially separated from the latter, and as were described hereinabove.

Finally, it should be noted that, in the cases of applying the method of the invention to calculate and restore the orientation of the line of sight of an optical picture-taking instrument on a spinning satellite (FIG. 16) or a carrier satellite bearing a scanning mirror 34 of the optical instrument 12 (FIG. 17), the orbit of the satellite may be non-geostationary or geostationary.

The invention claimed is:

1. Method of restoring the movements of a line of sight (V) in terms of roll, pitch and yaw of an observation instrument during an image sequence, according to which, at least a first and a second image containing one and the same portion of a scene being formed, the first and the second images being formed over the picture-taking duration [Ti, Tf] on the basis of the observation instrument mounted on a moving carrier, the takes of the first and the second images being offset in time by a substantially constant known value T; Tn being the average instant of acquisition of a chosen image n, n being the indice of an image, n going from i to f, i being the indice of the first image, f being the indice of the last image, T being the temporal deviation between the acquisition of two images; said movements of the line of sight (V) of the observation instrument in the course of the image sequence being determined by at least the following steps:

a) a step of selecting several characteristic zones in a first image and matching these zones with homologous zones in the second image, by textural or radiometric analysis, these homologous zones being taken in the vicinity of instants respectively Tn and Tn+T distributed between Ti and Tf in the said images of the same portion of the scene so as to obtain a measurement of the position at the instants respectively Tn and Tn+T of the said homologous zones, or of at least a particular point of these zones, in each of the two images of the said portion, b) a step of determining an image matching model by a geometric modeling of with an optical system; said image matching model giving for any point of a first image shot at the instant Tn, an estimate of the position of its homologous point in a second image shot at the instant Tn+T; said image matching model being a function of, in particular, the orientation of the line of sight (V) of the instrument at the instant Tn and angular variations of this line of sight (V) between Tn and Tn +T;

wherein the first and the second images have been acquired in push-broom mode and wherein the method further comprises the following steps:

c) a step of calculating the angular variations of the line of sight (V) of the observation instrument between the instants Tn and Tn+T by adjusting said image matching model, the adjustment of said image matching model consisting in calculating the values of the angular variations which minimize a function of the deviations between the position of the homologous zones of the second image that are predicted by the image matching model, and the position of the homologous zones of the second image as it is matched in step (a), and d) a step of reconstructing the movements of the line of sight (V) over the time horizon [Ti, Tf] by integrating and filtering the angular variations calculated in step (c).

2. The restoring method according to claim 1, wherein step (a) implements a matching of characteristic zones of images that is based on a radiometric or textural resemblance between at least two images acquired during the image sequence.

3. The restoring method according to claim 1, wherein at least one of the following procedures i) to iv) is used to select the characteristic zones associated with a given image sequence date Tn:
   i) selection of the points with double gradient greater than a given threshold in a zone of the image corresponding to the image sequence taken in the vicinity of the instant Tn;
   ii) selection of points having positions that are predetermined independently of the content of the image in the vicinity of the selected points, with possible rejection of points for which a matching quality criterion is below a given threshold;
   iii) selection of predetermined points, given by a priori knowledge of particular elements present in the scene;
   iv) selection of a subset of points on the basis of a set of characteristic points calculated by one of the above procedures or a similar procedure, so as to maximize the spatial distribution of the selected subset of points, and the quality of matching of the characteristic zones in the vicinity of the selected subset of points;
   this selection procedure being followed by a selection of a vignette in the vicinity of the points selected according to any of the procedures i) to iv) so as to improve the quality of matching.

4. The restoring method according to claim 1, wherein matched images are taken in spectral bands that may be identical or different.

5. The restoring method according to claim 1, wherein in step (c), the deviations involved in the function to be minimized are weighted by a positive scalar proportional to the estimated quality of the said matching of the characteristic zones between the two images.

6. The restoring method according to claim 1, wherein in the course of step (d), an integration and a filtering of the attitude variation estimates arising from step (c) are performed so as to reconstruct the movements of the line of sight of the instrument, apart from absolute component of the orientation of sighting, over the time interval [Ti, Tf] by at least one of the following procedures:
   using an inverse filtering, making it possible to enhance certain attenuated frequencies while limiting the impact of noise,
   by fitting an analytical model.

7. The restoring method according to claim 1, wherein in the absence of sufficient quality matching of the characteristic zones selected at the instant Tn, the orientation of the line of sight at the instant Tn is advantageously calculated by interpolating the line-of-sight orientations reconstructed by repeating steps a) to d) of claim 1 at instants preceding and following Tn.

8. The restoring method according to claim 6 wherein the a priori knowledge of the frequency content of the variations of the orientation of the line of sight is used to perform a filtering prior to step (d) that retains only the frequencies concerned.

9. The restoring method according to claim 1, wherein a number of images of one and the same scene that is strictly greater than two is used, steps a) to d) of claim 1 being applied to several pairs of images and the results obtained from the various pairs of images of the same scene are hybridized by implementing a global or iterative refinement of the current knowledge of the orientation of the line of sight during the image sequence.

10. The restoring method according to claim 1, wherein steps a) to d) of claim 1 is applied to a first pair of images advantageously from among the pairs of images that are assumed to be best correlated, so as to obtain a first reconstruction of the movements of the line of sight of the observation instrument in the course of the image sequence, then other pairs of images are iteratively processed, initializing the matching model on the basis of the line-of-sight orientation values calculated in the previous iteration, until the pairs of images are exhausted or convergence is obtained.

11. The restoring method according to claim 1, wherein the instrument makes it possible to form at least three images offset over time, at least two of the images exhibiting a strong mutual correlation, and at least one other image that is weakly correlated with the other two, and that the movements of the line of sight are corrected on at least one image that is weakly correlated with the other two by reconstructing the movements of the line of sight by repeating steps a) to d) of claim 1 to at least one pair of images exhibiting a strong mutual correlation.

12. The restoring method according to claim 1, wherein the matching model is initialized with a priori knowledge of the orientation of the line of sight in the course of the image sequence, the said a priori knowledge arising from an orientation setpoint or from a measurement derived from attitude sensors such as star sensors, gyrometers, or from a knowledge of the absolute position on the surface of the terrestrial globe of characteristic zones recognizable in the image, or a hybridization of such knowledge.

13. The restoring method according to claim 1, wherein parallax effects are taken into account in the matching model, using a priori knowledge of the relief of the scenes observed.

14. An apparatus for restoring the movements of a line of sight (V) of an observation instrument onboard a satellite, wherein:
   the observation instrument comprises in its focal plane at least one strip-type detector of one to a few tens of lines, each line comprising a few thousand to ten thousand pixels,
   the satellite is placed in a non-geostationary orbit,
   the satellite is pointed in such a way that the at least one strip-type detector scans a zone to be observed during image sequences, and
   a processor configured for performing the restoring method according to claim 1 to estimate the orientation of the line of sight (V) of the observation instrument in the course of an image sequence.

15. An apparatus for restoring the movements of a line of sight (V) of an observation instrument onboard a satellite, wherein:
   the observation instrument comprises in its focal plane at least one strip-type detector,
   the line of sight (V) of the instrument is controlled in such a way that the at least one detector scans the surface of a terrestrial globe, either by rotation of the satellite, or by the scanning of an orientatable mirror placed in the optical path of the instrument, and
   a processor configured for performing the restoring method according to claim 1 to estimate the orientation of the line of sight (V) of the observation instrument during an image sequence.

16. The apparatus according to claim 15, wherein the orbit of the satellite is geostationary.

17. The apparatus according to claim 15, wherein
   the instrument comprises in its focal plane at least two strip-type detectors, the strips being aligned in such a way that their lines and columns are respectively substantially parallel, and the two strips of each pair of strips, at least one pair of which is thus in the focal plane, being separated from one another by a determined distance in the focal plane, the detectors thus observing approximately the same portion of the scene during an image sequence, with a time offset depending directly on the distance between the detectors at the focal plane.

18. The apparatus according to claim 15, wherein each line of the at least one strip-type detector of the focal plane forms an image of the scene, and that a subset of the images thus created by the at least one strip-type detector of the focal plane can be processed according to the method for restoring the orientation of the line of sight (V) of the instrument.

19. The apparatus according to claim 17, wherein the separation of the detectors in the focal plane is optimized with the aim of reconstructing the movements of the line of sight (V) in a given frequency band.

20. The apparatus according to claim 14, wherein there is just one detector at the focal plane scanning the scene, and that the processor is configured for performing the restoring method to at least two images formed on the basis of at least two lines of the detector.

21. The apparatus according to claim 20 wherein, the choice of the at least two lines of the detector that are used to form the at least two images is optimized with the aim of reconstructing the movements of the line of sight (V) in a given frequency band.

22. The restoring method according to claim 7, characterized in that a priori knowledge of the frequency content of the variations of the orientation of the line of sight is used to perform a filtering prior to step (c) that retains only the frequencies concerned.

23. The apparatus according to claim 14, wherein
the instrument comprises in its focal plane at least two strip-type detectors, the strips being aligned in such a way that their lines and columns are respectively substantially parallel, and the two strips of each pair of strips, at least one pair of which is thus in the focal plane, being separated from one another by a determined distance in the focal plane, the detectors thus observing approximately the same portion of the scene during an image sequence, with a time offset depending directly on the distance between the detectors at the focal plane.

24. The apparatus according to claim 14, wherein each line of the at least one strip-type detector of the focal plane forms an image of the scene, and that a subset of the images thus created by the at least one strip-type detector of the focal plane can be processed according to the method for restoring the orientation of the line of sight (V) of the instrument.

25. The apparatus according to claim 23, wherein the separation of the detectors in the focal plane is optimized with the aim of reconstructing the movements of the line of sight (V) in a given frequency band.

26. The apparatus according to claim 15, wherein there is just one detector at the focal plane scanning the scene, and that the processor is configured for performing the restoring method to at least two images formed on the basis of at least two lines of the detector.

27. The apparatus according to claim 26 wherein, the choice of the at least two lines of the detector that are used to form the at least two images is optimized with the aim of reconstructing the movements of the line of sight (V) in a given frequency band.

* * * * *